United States Patent [19]
Miller

[11] Patent Number: 5,682,404
[45] Date of Patent: Oct. 28, 1997

[54] METHOD AND APPARATUS FOR SIGNAL TRANSMISSION AND RECEPTION

[76] Inventor: William J. Miller, 100 Waltham Rd., #18, Watertown, Mass. 02272

[21] Appl. No.: 683,180

[22] Filed: Jul. 18, 1996

Related U.S. Application Data

[63] Continuation of Ser. No. 342,259, Nov. 18, 1994, abandoned, which is a continuation of Ser. No. 33,518, Mar. 17, 1993, Pat. No. 5,367,516.

[51] Int. Cl.$^6$ .................................................... H04B 1/38
[52] U.S. Cl. ............................................................. 375/222
[58] Field of Search .................................. 375/222, 365, 375/368, 205, 266, 356; 370/110.4, 276, 431, 463; 379/93, 98

[56] References Cited

U.S. PATENT DOCUMENTS

| | | |
|---|---|---|
| 4,438,511 | 3/1984 | Baran .................................... 370/19 |
| 4,493,082 | 1/1985 | Cumberton et al. ................ 371/43 |
| 4,596,898 | 6/1986 | Pemmaraju . |
| 4,654,480 | 3/1987 | Weiss . |
| 4,679,227 | 7/1987 | Hughes-Hartogs ................ 379/98 |
| 4,731,816 | 3/1988 | Hughes-Hartogs ................ 379/98 |
| 4,800,518 | 1/1989 | Miller .................................. 364/819 |
| 4,811,394 | 3/1989 | Ragavan et al. . |
| 4,817,146 | 3/1989 | Szczutkowski et al. . |
| 4,882,276 | 11/1989 | Lang et al. ........................... 370/24 |
| 4,907,271 | 3/1990 | Gilham . |
| 4,914,699 | 4/1990 | Dunn et al. . |
| 4,920,565 | 4/1990 | Strawczynski et al. . |
| 4,924,516 | 5/1990 | Bremer et al. . |
| 4,979,188 | 12/1990 | Kotzin et al. . |
| 4,985,919 | 1/1991 | Naruse et al. . |
| 5,031,214 | 7/1991 | Dziewit et al. . |
| 5,052,024 | 9/1991 | Moran, III et al. ................ 375/222 |
| 5,054,034 | 10/1991 | Hughes-Hartogs ................ 375/8 |
| 5,111,504 | 5/1992 | Esserman et al. . |
| 5,150,401 | 9/1992 | Ashby, III et al. . |
| 5,179,542 | 1/1993 | Reese et al. . |
| 5,204,874 | 4/1993 | Falconer et al. ................... 375/1 |
| 5,235,615 | 8/1993 | Omura .................................. 375/205 |
| 5,365,550 | 11/1994 | Roberson ............................ 375/206 |

OTHER PUBLICATIONS

Lattice Structures for Optimal Design and Robust Implementation ot Two-Channel Perfect-Reconstruction QMF Banks; P. P. Baidyanthan, Member, IEEE, and Phuong-Quan Hoang, Student Member, IEE; IEEE Transactions on Acoustics, Speech and Signal Processing, vol. 36, No. 1, Jan., 1988, pp. 81–94.

Perfect Reconstruction FIR Filter Banks: Some Properties and Factorizations; Martin Vetterli, Member, IEEE, and Didier Le Gail, Member, IEEE, Transactions on Acoustics, Speech, and Signal Processing, vol. 37, No. 7, Jul., 1989, pp. 1057–1071.

Improved Technique for Design of Perfect Reconstruction FIR QMF Banks with Lossless Polyphase Matrices; P.P. Vaidyanathan, Senior Member, IEEE, Truong Q. Nguyen, Student Member, IEEE, Zinnur Doganata, Student Member, IEEE, and Tapio Saramaki, IEEE Transactions on Acoustics, Speech, and Signal Processing, vol. 37, No. 7, Jul., 1989, pp. 1042–1056.

The Digital All-Pass Filter: A Versatile Signal Processing Building Block; Phillip A. Regalia, Student Member, IEEE, Sanjit K. Mitra, Fellow, IEEE, and P. P. Vaidyanathan, Member, IEEE; Proceedings of the IEEE, vol. 76, No. 1, Jan., 1988, pp. 19–22.

P.P. Vaidyanathan and Phuong-Quan Hoang, The Perfect-Reconstruction QMF Bank: New Architectures, Solutions, and Optimization Strategies, 1987 IEEE pp. 2169–2172.

"The Analog Voice Privacy System;" R. V. Cox, et al. IEEE Publications, 1986, pp. 341–344.

Rioul, O. et al., *IEEE SP Magazine*, pp. 14–38 (Oct. 1991).

*Primary Examiner*—Stephen Chin
*Assistant Examiner*—Kevin Kim
*Attorney, Agent, or Firm*—Weingarten, Schurgin, Gagnebin & Hayes LLP

[57] ABSTRACT

An apparatus and method for transmitting and receiving signals includes an analyzer, for decomposing an input signal into a plurality of signals with each one of the plurality of signals occupying one of a corresponding plurality of channels and a synthesizer, having a plurality of channels with each channel adapted to receive one of the plurality of analyzer signals, for combining the plurality of signals to reconstruct the input signal.

31 Claims, 11 Drawing Sheets

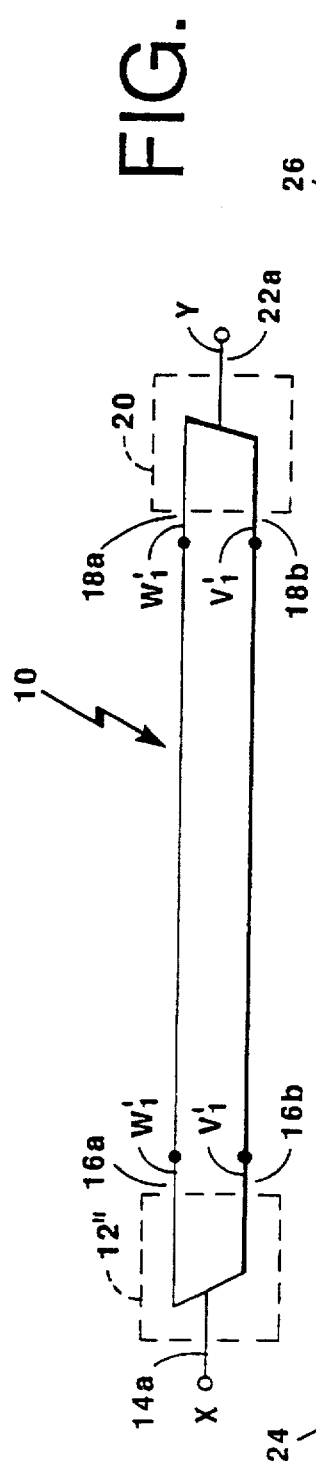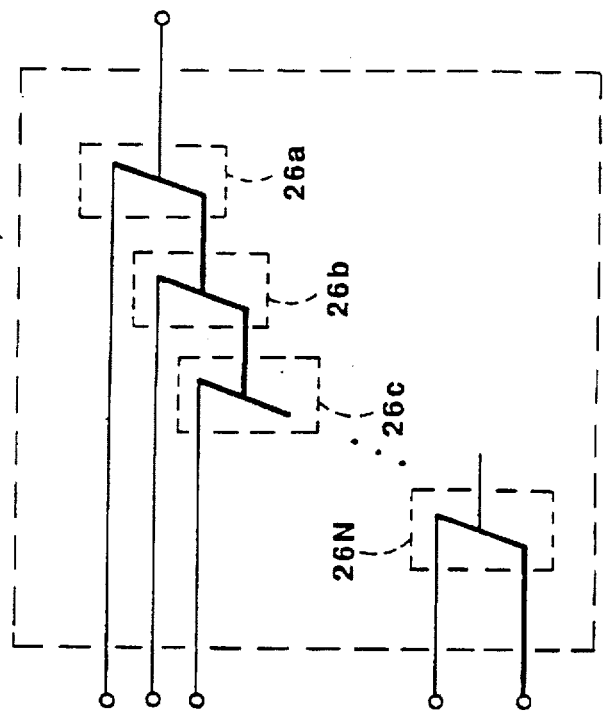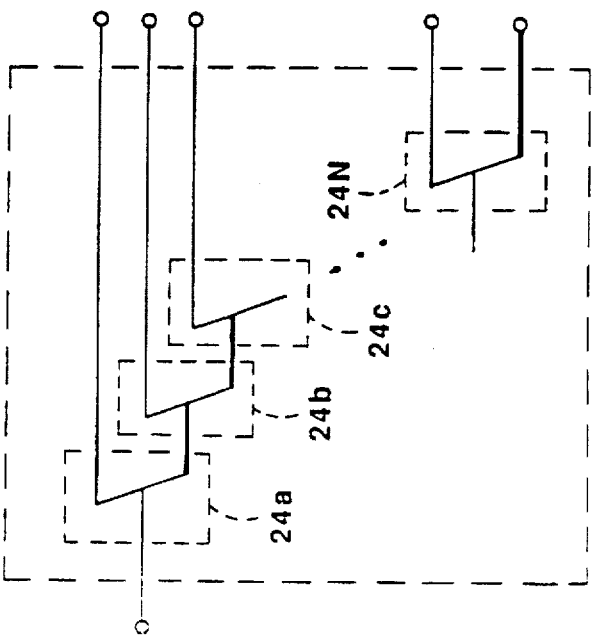

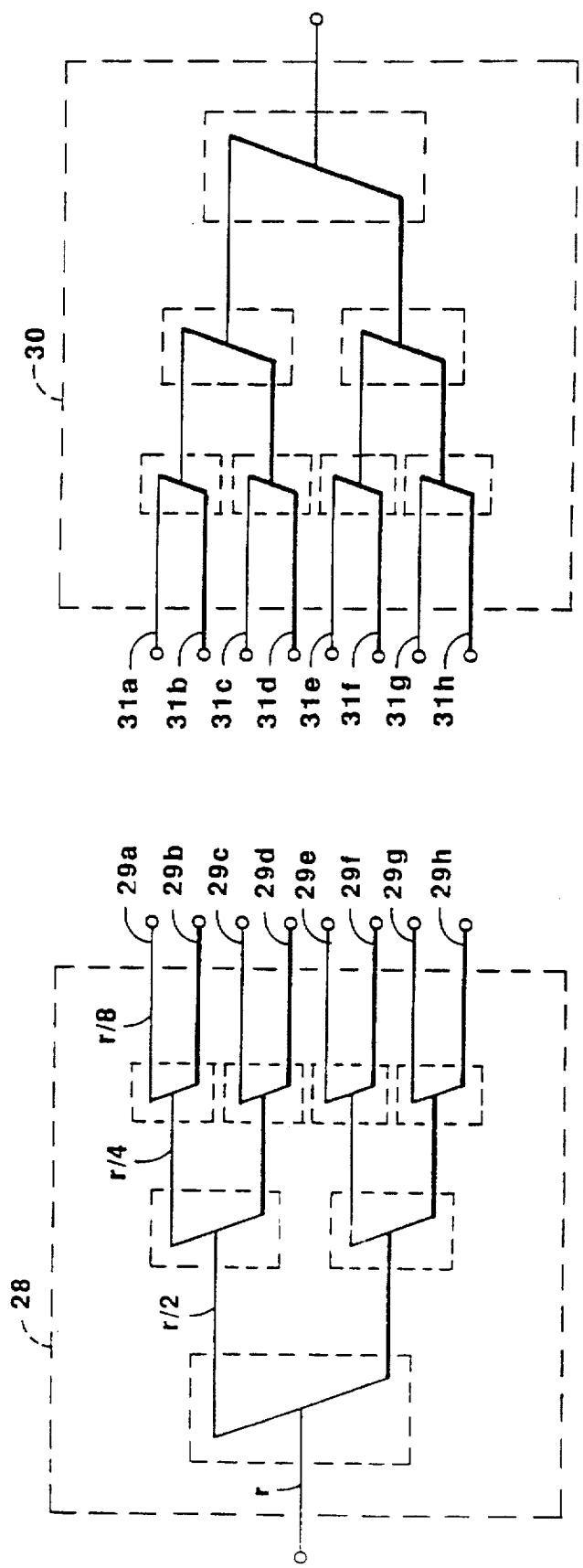

METHOD AND APPARATUS FOR SIGNAL TRANSMISSION AND RECEPTION

This application is a continuation of Application No. 08/342,259, filed Nov. 18, 1994 (now abandoned), which is a continuation of Ser. No. 033,518 now U.S. Pat. No. 5,367,516, filed Mar. 17, 1993.

FIELD OF THE INVENTION

This invention relates to signal transmitting and receiving systems and more particularly to signal decomposition and reconstruction techniques in signal transmission and reception systems.

BACKGROUND OF THE INVENTION

As is known in the art, a modulator-demodulator (modem) is an electronic device that modulates transmitted signals and demodulates received signals. The modem generally provides an interface between an analog communications system and digital devices to thus make possible analog transmission of digital information between two terminals or stations. Such transmissions may be over a transmission line, such as a telephone or other communication line for example, coupled between the two stations. Such transmission lines are generally band-limited. That is, the information may be transmitted over the transmission lines only over a predetermined range of frequencies. For example, telephone transmission lines are generally provided having a bandwidth of 3 kilohertz (kHz). Thus, the speed with which the modem may transmit and receive data is limited, in part, due to bandwidth limitations of the transmission medium.

As is also known, an analog signal representing, e.g. a voice signal, may be represented as a stream of bits (i.e a digital signal). The digitized signal, which may be converted back to an analog representation of the digital data for the purpose of transmission over a telephone lines, is less susceptible to noise on the telephone line, is capable of multiplexed channel operation in the telephone bandwidth, reduces crosstalk and enables relatively easy digital encryption for secure transmission.

The digitized voice signal, which typically is at, e.g., 64,000 bits-per-second (bps), may not be readily sent by modem within the available approximately 3,000 Hz bandwidth of the telephone lines or be readily sent at that bit rate within the available telephone line bandwidth. To enable more convenient transmission and/or multiplexed transmission, compression of the 64,000 bps digitized voice signal is generally employed. For example, with compression from 64,000 bps to 2,400 bps, four simultaneous channels of 2,400 bps each may be multiplexed via a modem onto a 9,600 bps data stream transmitted over the bandwidth of the analog telephone lines.

As is also known in the art, encryption of analog signals such as voice signals, for example, may be accomplished via analog or digital techniques. Analog techniques include frequency inversion and other operations (e.g. modulation) on the amplitude, frequency or phase of the time varying analog signal. Such operations may or may not be accomplished with a digital computer.

Digital voice encryption techniques, including the American National Standard Institute's (ANSI) data encryption standard (DES) algorithm, perform bit stream operations on digitized samples of the analog signal and then transmit the digital result to a receiver. Such transmission may be accomplished through a modem for example. To use a modem for transmission of a speech signal, the speech signal is compressed. That is, some of the input information (i.e. the input speech signal) is discarded such that the signal may be transmitted at a rate at which the modem operates. This results in a loss of information which may manifest itself as a degradation in voice sound quality.

The processing required to perform the compression and expansion of digitized voice results in an undesirable delay and consequently in a two line transmission system, for example, objectionable echo signals result. Furthermore, the inefficiency of modems limits the rate at which a modem may transmit and receive signals fed thereto. Thus it would be desirable to provide a system which minimizes such processing time and thus minimizes the echo signal and also maximizes the rate at which a modem may transmit and receive data over a transmission link.

Thus, at least several problems have tended to impair the effectiveness of conventional limited bandwidth, e.g., telephone bandwidth, analog and digital voice transmission apparatus.

SUMMARY OF THE INVENTION

In accordance with the present invention a modem includes a modulator, for receiving on each of a plurality of modulator channels an input sample, wherein the modulator groups the first plurality of input samples to form an input data frame and wherein the modulator multiplies the input data frame by a first rotation matrix having a row dimension and a column dimension corresponding to the number of channels in the modulator to provide an output data frame corresponding to a modulated output signal. The modem further includes a demodulator, having a plurality of channels, for receiving a data frame corresponding to a modulated output signal provided from a first plurality of input samples, wherein the demodulator multiplies the received data frame by a second rotation matrix having a row dimension and a column dimension corresponding to the number of channels in the demodulator to provide a demodulated signal corresponding to an output data frame having a first plurality of output samples, wherein the demodulator provides on each of the demodulator channels a corresponding one of the first plurality of output samples wherein each of the output samples correspond to one of the first plurality of input samples. With this particular arrangement, a modem based on an invertible transform which operates on groups of input samples is provided. The invertible transform is here provided by application of the rotation matrix. By multiplying each of the data frames in the modulator by the first rotation matrix a signal may be transmitted over a transmission link at a relatively high data rate. The modulated data frame may then be sent over a transmission link and received in a demodulator of a second modem. The demodulator demodulates the received modulated data frame by multiplying the received modulated data frame by a second rotation matrix which performs the inverse operation of the first rotation matrix and thus provides a demodulated signal. The demodulated signal may then be fed to a receiver for further processing. The transform provided by the rotation matrix is computationally simple and thus results in a lower delay time than conventional techniques. A coding circuit may be coupled to at least one channel of the modulator to provided a coded modulated data frame. A corresponding decoding circuit may be coupled to a corresponding channel of the demodulator of the second modem to thus decode the coded modulated data frame. A timing circuit coupled between the first and second modems provides timing signals to each of the first and second modems.

In accordance with a further aspect of the present invention, a method and apparatus for providing a modem for sending digital data over an analog medium includes a synthesizer to provide a modulator and an analyzer to provide a demodulator. With this particular arrangement, digital data to be transmitted may be applied to the input ports of the synthesizer. In a preferred embodiment the data may be scrambled by a random number generator coupled to the synthesizer to thus provide an encrypting modem. Such a modem may be provided using relatively simple hardware and thus the modem may be provided as a portable encrypting modem. The modulation and demodulation operations may be accomplished using invertible transform techniques which result in faster processing operations and thus result in a shorter delay. Thus, the modem may transmit and receive signals at a higher data rate than modems heretofore.

In accordance with a still further aspect of the present invention a signal encryptor includes an analyzer, for decomposing an input signal into a plurality of analyzer signals, each of said analyzer signals provided on one of a plurality of analyzer channels and an encryptor circuit, coupled to each of the analyzer channels, for modifying at least one of the analyzer signals. The signal encryptor further includes a synthesizer, having a plurality of synthesizer channels each of the synthesizer channels coupled to a corresponding one of the analyzer channels, wherein the synthesizer receives each of the plurality of analyzer signals fed thereto and combines the plurality of analyzer signals into a reconstructed output signal corresponding to an encrypted input signal. With this particular arrangement, a signal encryptor for encrypting sampled signals for secure transmission over a transmission medium or link without compression is provided. The signal encryptor and likewise a corresponding signal decryptor may be provided from an inverse transform such as a rotation matrix. The rotation matrix operates on a block of encrypted data signals to provide an encrypted data frame for transmission over the transmission link. The signal encryptor may further be provided having an input signal conditioning circuit coupled to the analyzer input for appropriately filtering and sampling, with an analog to digital converter, an analog signal fed thereto. The signal encryptor may further be provided having an output signal conditioning circuit coupled to the synthesizer output for appropriately converting sampled a digital signal fed thereto to an analog signal and for coupling the analog signal to an signal encryptor output port through a filter having appropriately selected filter characteristics. The signal encryptor operates such that the spectrum of the input signal may be modified at each frequency, or band of frequencies, by a secret number. The transmitted signal approximates white noise and thus the new spectrum conceals the original signal. A receiver inverts the operation.

The method and apparatus of the present invention thus provides an invertible transform technique for modifying the spectrum of the transmitted signal at each frequency or band of frequencies by a value which may be for example a secret number. The modified spectrum conceals the original signal fed from a transmitter to a transmission link. Upon reception, a receiver inverts the transform operation to exactly recover the original signal. Thus, by providing an analyzer for separating an incoming signal into a plurality of signals using an invertible transform and a synthesizer fed by each one of the plurality of signals for reconstructing the plurality of signals using an inverse transform, the original input signal may be recovered at the synthesizer output port.

BRIEF DESCRIPTION OF THE DRAWINGS

The foregoing features of this invention as well as the invention itself may be more fully understood from the following detailed description of the drawings in which:

FIG. 1 is a diagrammatical representation of a signal decomposition-recomposition system;

FIG. 1A is a diagrammatical representation of a cascade analyzer;

FIG. 1B is a diagrammatical representation of a cascade synthesizer;

FIG. 1C is a diagrammatical representation of a tree analyzer;

FIG. 1D is a diagrammatical representation of a tree synthesizer;

DESCRIPTION OF THE PREFERRED EMBODIMENTS

Figure 2:
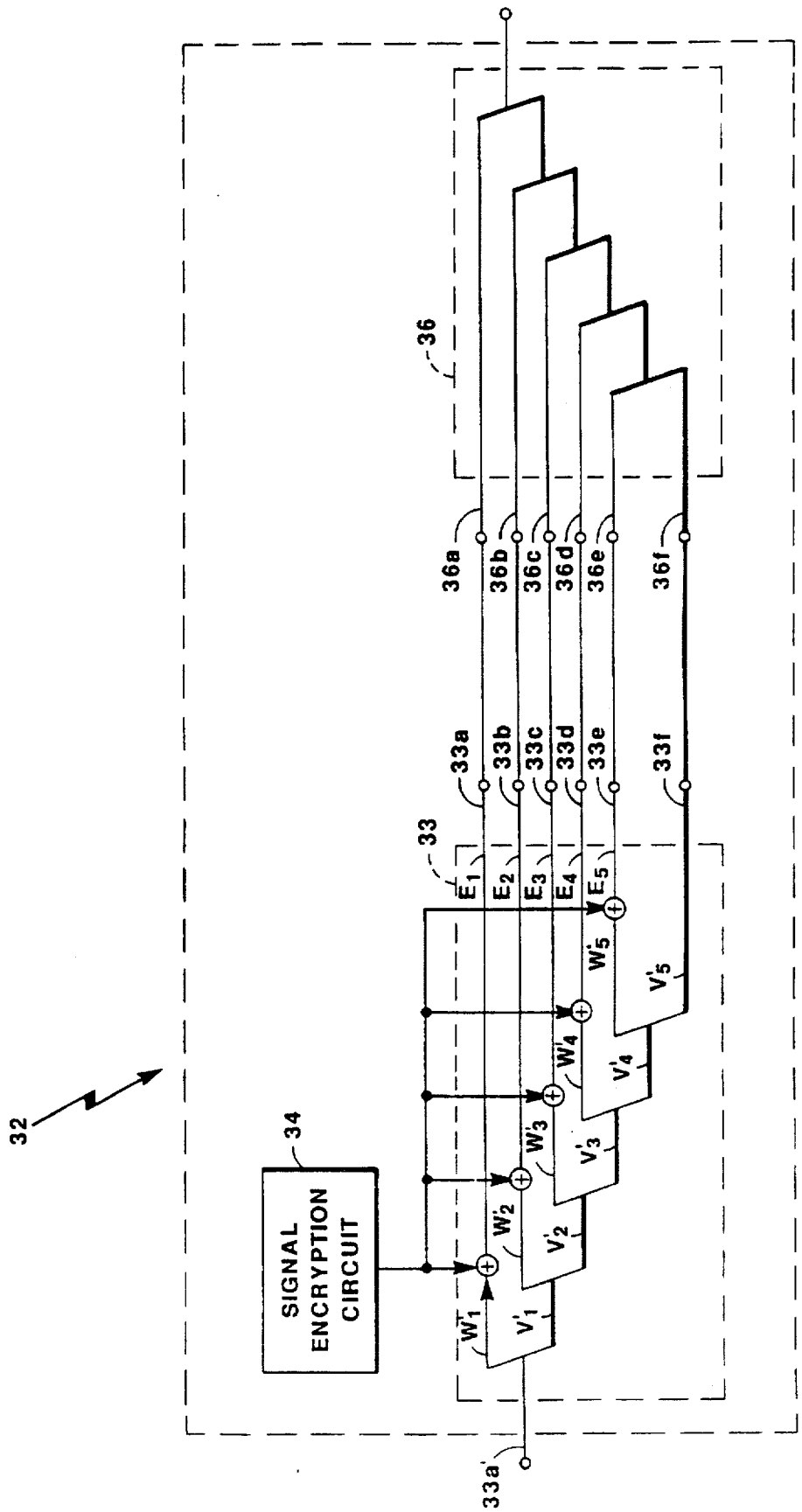
FIG. 2 is a block diagram of a signal encryptor.

Referring now to FIG. 1 a signal decomposition-recomposition system 10 includes an analyzer 12 having an input port 14a and a pair of output ports 16a, 16b. Each of the output ports 16a, 16b are coupled to a corresponding pair of input ports 18a, 18b of a synthesizer 20.

An analog input signal X fed to the analyzer input port 14a is decomposed into a pair of signals W' and V' each of which is fed to a corresponding one of the output ports 16a, 16b. Similarly, a pair of input signals W', V' fed to the synthesizer input ports 18a, 18b are reconstructed in to an output signal Y at a synthesizer output port 22a. The decomposition and reconstruction processes performed by the analyzer 12 and the synthesizer 20 as well as the signals V' and W, will be described further hereinbelow. Suffice it here to say that the input signal X is decomposed into the signals V' and W' such that the signals V' and W' may later be combined to exactly reconstruct the input signal X.

It should be noted that the sub-analyzer and sub-synthesizer building blocks operate digitally, however, for clarity in the description, the signal conditioning circuits required to convert between analog signals and digital signals in the system have been omitted. Such signal conditioning circuits will be described in conjunction with FIG. 4 below. Briefly, however, and as will be described in conjunction with FIG. 4, when an input signal to a system building block, e.g. a sub-analyzer or sub-synthesizer, corresponds to an analog signal, the signal should first be fed through a filter having filter characteristics selected to provide Nyquist filtering. The appropriately filtered signal may then be sampled by an analog-to-digital converter (ADC). Similarly, if the output from a system building block is to be an analog signal, the signal should be fed to a digital-to-analog converter (DAC) and fed to a second filter likewise selected having filter characteristics selected to provide Nyquist filtering.

The sub-synthesizer 20 performs the inverse operation of the sub-analyzer 12, and vice versa. That is, if the signals W' and V' from a sub-analyzer are applied as input signals to the sub-synthesizer input ports 18a, 18b, the output signal Y will be identical to the sequence of input samples, X, except for a predetermined time delay. In a preferred embodiment, the time delay corresponds to one sample time.

Likewise, applying the signals V', W' to the respective synthesizer input ports 18a, 18b and then applying the resultant output signal Y to the analyzer input port 14a should provide at the respective analyzer output ports 16a, 16b the original input signals V' and W'.

As described above, the analyzer 12 and synthesizer 20 provide signal decomposition and reconstruction functions. As will be described below, the sub-analyzer and sub-synthesizer may be used as building blocks and may be coupled to provide more complex circuits which may themselves be coupled to provide a variety of signal transmitting and receiving systems. Furthermore, the analyzer 12 and synthesizer 20 as well as other system building blocks to be described hereinbelow may be efficiently implemented in hardware, software or by a combination of hardware and software.

The analyzers and synthesizers to be described herein operate on an ordered sequence of numbers, which may be, but are not limited to, samples from an analog to digital converter (ADC). For example, samples may be expressed as $X(0), X(1), X(2),$ and $X(3)$ where $X(0)$ is the most recent sample. Each of the binary numbers $X(0)$ through $X(3)$ has a particular value within a predetermined range of values. An 8-bit ADC, for example, may provide a range of decimal values between $-128$ to $+127$.

The sequence of samples $X(0)$ through $X(3)$ may be considered as the coordinates of a vector $[X]$ in a 4-dimensional space. A linear transformation may be made from the coordinate system of $X$ to another coordinate system in the same 4-dimensional space. Thus, the vector $X$ may be transformed to a vector $Y$ by a "rotation" matrix $C$. In matrix notation this may be expressed as:

$$[Y]=[C]*[X]$$

Using axes of the new coordinate system that are mutually orthogonal, the vector $Y$ has components which correspond to the projections of $X$ onto the new transformation axes. Such projections are provided by forming a vector dot product.

In a 4 dimension case for example, a set of Walsh codes, Code 1–Code 4, may be provided as:

Code 1=+1+1+1+1

Code 2=+1−1+1−1

Code 3=+1+1−1−1

Code 4=+1−1−1+1

The Walsh codes Code 1–Code 4 above represent an orthogonal coordinate axis in the 4-dimensions of this time ordered space. Codes 1–4 have a length corresponding to the square root of 4, (i.e. the dot product of code 1 with itself equals 4) and thus are not unit vectors.

The rotation matrix C may be expressed as:

$$[C] = \begin{matrix} C_1 = +1 +1 +1 +1 \\ C_2 = +1 -1 +1 -1 \\ C_3 = +1 +1 -1 -1 \\ C_4 = +1 -1 -1 +1 \end{matrix}$$

That is, the rows $C_1$–$C_4$ of the rotation matrix C correspond to the components of the Walsh code vectors such that matrix multiplication between the rotation matrix C and the vector X is equivalent to the dot product of a particular one of the vectors $C_1$–$C_4$ with the vector X. The components of the row vector X may be expressed as:

$$[X]=[X(0), X(1), X(2), X(3)]$$

A new state vector Y may be expressed as:

$$[Y]=[[C_1],[X], [C_2],[X], [C_4],[X], [C_4],[X]]$$

where * symbolizes a dot product operation between $[X]$, and the Walsh vectors $[C_1]$ through $[C_4]$. The new state vector $[Y]$ completely describes the original state defined by $[X]$ and may be computed on every group of 4 samples $X(0)$–$X(3)$.

The linear rotation operation is exactly invertible, and thus:

$$[X]=[C^\wedge][Y]$$

where $[C^\wedge]$ is the inverse of $[C]$. The matrix $C^\wedge$ may be found from the relation:

$$[C^\wedge]=1/L\ [C]$$

where L corresponds to the dimension of a row or column vector of the matrix $C^\wedge$.

In a two dimensional case, Walsh vectors may be expressed as $C_1=[+1,+1]$ and $C_2=[+1,-1]$. Thus, analyzers may be defined having 2 outputs using the 2-dimensional vector above.

Walsh vectors of any dimension may be generated by the two dimensional vectors $C_1, C_2$. That is, substitution of a set of Walsh codes into a 2-dimensional generator matrix provides a new Walsh code having twice the dimension. Using this procedure an N-dimensional transformation needed to provide an analyzer, may be provided. Thus, because of the way that Walsh vectors are constructed from their two dimensional Walsh generators, higher dimension analyzers and synthesizers may be constructed from the 2-dimensional case.

With this matrix transformation method, matrix equations for providing a modem or a signal encryptor may be generated. The fundamental operation in the requisite computations is addition and subtraction of terms.

It should be noted that in the case of a cascade analyzer or synthesizer provided using the matrix method with a matrix having N dimensions, the lowest frequency channel is operated on by the matrix vector $C_1$ and each subsequent channel i is operated on by a corresponding matrix vector $C_i$ until the highest frequency channel is operated on by the matrix vector $C_N$. Thus, in the case of a 4 dimension matrix the lowest frequency channel is operated on by the matrix vector $C_1$ and the highest frequency channel is operated on by the matrix vector $C_4$. The case of a tree analyzer or synthesizer provided by the matrix method will be described in conjunction with FIGS. 1C and 1D below.

In another preferred method the equations which describe the sub-analyzer output signals V' and W' may be provided as:

$$V' = SHIFT \cdot X(n-1) - BN \cdot W' \qquad \text{Equation 1}$$

$$W' = 2 \cdot X(n-1) - X(n) - X(n-2) \qquad \text{Equation 2}$$

In which:

V' corresponds to a scaling or filtering function of a sampled input signal X;

W' corresponds to a residual or derivative of the sampled input signal X;

X(n) corresponds to the most recent input sample;

X(n−1) and X(n−2) correspond to the two previous input samples;

SHIFT corresponds to a variable set equal to a positive power of 2 (such as 32, or 64, or . . .); and BN corresponds to a positive integer having a value between 0 and SHIFT and is preferred to have a relatively small value.

As will be explained further below the scaling function V' and the residual W' defined by Equations 1 and 2 may be evaluated on alternate input samples of the input signal X, such that the value of the residual W' corresponds to twice the difference between the "center" sample, X(n−1), and the midpoint of a line connecting the two nearest neighbors of X(n−1) here, the two nearest neighbors being represented as X(n) and X(n−2). When Equations 1 and 2 are evaluated on alternate input samples, only the odd numbered (or alternatively only the even numbered) "center points" are selected for the calculation. Thus, the output rate of the sub-analyzer corresponds to one-half the input rate of the input signal X.

The residual W' may also be interpreted as a deceleration about the center point. Thus it is possible to define the residual W' as an acceleration and substitute −W' for W' in the Equations 1 and 2 above to provide an alternate and essentially equivalent expression for the residual W'.

Other implementations using more nearest neighbor points and which define the residual W' as a higher order or first order derivative of the function evaluated about the center point, may also be used.

The interpretation of the residual W'(N) described above indicates that the residual W'(N) responds only to changes in the slope around alternate samples. Thus one characteristic of the residual W' in the present invention is that the residual W' is provided having a value of zero when the slope about the center point is constant.

The conventionally defined residual W(n) is related to the effective residual W'(n) as defined in the present invention by $$W(n) = B \cdot W'(n)$$

As a consequence of the definition for the residual W'(n) in the present invention, signal compression based on linear or nonlinear quantization of the residual W'(n) (rather than the residual W(n) as defined in the conventional approach) may result in improved performance over compression schemes based upon conventional definitions of the residual W(N) such as:

$$W(N) = X(n-1) - V(N)$$

The sub-synthesizer operation may be described by equations 3 and 4 below:

$$Y(n-1) = Y'(n-1)/SHIFT \qquad \text{Equation 3}$$

$$Y(n) = Y'(n)/SHIFT \qquad \text{Equation 4}$$

in which:

SHIFT corresponds to a power of 2 and $$Y'(n-1) = V' + BN \cdot W';$$

$$Y'(n) = 2 \cdot Y'(1) - Y'(-) - SHIFT \cdot W'; \text{ and}$$

Y'(−) corresponds to a saved, previously calculated (i.e. recursive), value of Y'(n).

By defining the variable SHIFT, as above and taking advantage of the fact that multiplication and division by a power of two is equivalent to a right or left shift on a binary computer, practical implementations of these equations may be provided with relatively little and simple hardware and are therefore preferred.

Thus in the approach of the present invention, the residual W' has been defined to provide a particular characteristic and the sequence V' is selected to provide the remainder of the sequence.

Referring now to FIG. 1A, a so-called "cascade analyzer" 24 includes a plurality of here N sub-analyzers. The cascade analyzer 24 may be provided by feeding the signal V'$_1$ from an output port of a first sub-analyzer 24a into the input port of a second sub-analyzer 24b and feeding a signal V'$_2$ from the output port of the second sub-analyzer into the input port of a third analyzer (not shown) and so on. The process continuing until a sub-analyzer 24N provides a signal V'$_N$ having a predetermined sample rate.

For example, in a communication system it may be desirable to couple a plurality of say N sub-analyzers as described above where N is selected such that a signal V'$_N$ is selected such that the signal V'$_N$ is provided having a sample rate which is below twice the lower frequency cutoff of the communications link. Since each sub-analyzer halves the sample rate to its input, the various output signals, W'$_1$, W'$_2$, ... W'$_N$ of the cascade analyzer are provided at differing rates.

Referring now to FIG. 1B a so-called "cascade synthesizer" 26 may be provided from a plurality of sub-synthesizer 26a–26N which may be of the type described above in conjunction with FIG. 1. The cascade synthesizer operates to provide the inverse operation of the cascade analyzer.

Referring now to FIG. 1C a so-called "tree analyzer" 28 may be provided by appropriately coupling a plurality of sub-analyzers 29a–29g each of which may be of the type described above in conjunction with FIG. 1. Thus, in addition to a cascade emanating from the scale function V'(N), it is also possible to have residual cascades emanating from one or more residual sequences W'(N). That is, the residual sequences W'(N) may themselves be considered as inputs for a multiresolution analysis. It is therefore, in that case, possible to provide both the scaling function sequence V' and the residual sequence W' having equal same sample rates. Here, the sample rate corresponding to one-eighth the original sample rate.

The tree analyzer 28 may be provided by analyzing each of the residual sequence outputs W' until all such sequences are brought down to one rate, which is normally below the Nyquist rate of the lower cutoff frequency of a transmission link with which the analyzer cooperates. The three level analyzer tree 28 is here provided having all of its output 29a–29h at ⅛ the sample rate, r, of the analog input signal, X. Each output sample may include many more bits per sample than the input sample, however, the numbers represented by those output samples will usually be small in magnitude and easily requantized by a quantizer (not shown).

Referring now to FIG. 1D a so-called "tree synthesizer" 30 may be provided from a plurality of sub-synthesizers 31a–31g, each of which may be of the type described above in conjunction with FIG. 1. The tree synthesizer 30 provides the inverse operation of the tree analyzer 28 (FIG. 1C).

It should be noted that in each of the applications to be described herein below in conjunction with FIGS. 2–8, the term analyzer as used throughout FIGS. 2–8 may be used to indicate a sub-analyzer, a cascade analyzer, or a tree analyzer element and likewise, the term synthesizer referred to in FIGS. 2–8 may be used to indicate a sub-synthesizer, a cascade synthesizer or a tree synthesizer element, each of which have been described above in conjunction with FIGS. 1–1D. Each of the analyzer and synthesizer elements may be provided according to the matrix transformation technique or alternatively each of the analyzer and synthesizer elements may be provided according to the three point equations of the forms of Equations 1 and 2 above, or alternatively still, each of the analyzer and synthesizer elements may be provided according to equations of the form:

$$W'=X(n)-X(n-2)$$

$$V'=X(n-1)$$

In the case where analyzers and synthesizers are provided as tree type analyzers and synthesizers the matrix vectors $C_i$ where i=1, 3, 5, etc . . . operate on the channels in the bottom portions of the tree analyzer or synthesizer while the matrix vectors $C_i$, i=2, 4, 6, etc . . . operate on channels in the top half of the tree analyzer or synthesizer. Thus, if the analyzer 28 having channels 29a–29h were provided by an 8 dimensional matrix having vectors $C_1$ through $C_8$ then channels 29h through 29e would be operated on, respectively, by matrix vectors $C_1$, $C_3$, $C_5$, and $C_7$ and channels 29d through 29a would be operated on, respectively, by matrix vectors $C_2$, $C_4$, $C_6$, and $C_8$.

Referring now to FIG. 2 a signal encryptor 32 includes an analyzer 33 having signal encryption circuit 34, which may be provided for example as a random number generator, coupled thereto. The analyzer 33 is provided by coupling a plurality, here five, sub-analyzers as shown. Each of the sub-analyzers may be of the type and thus operate in a similar manner as the sub-analyzer described above in conjunction with FIG. 1. Each of a plurality of analyzer output ports 33a–33f are coupled to a corresponding one of a like plurality of input ports 36a–36f of a synthesizer 36. Likewise, the synthesizer 36 is provided by coupling a plurality, here five, sub-synthesizers as shown. Each of the sub-synthesizers may be of the type and thus operate in a similar manner as the sub-synthesizer described above in conjunction with FIG. 1.

It should be noted that here five sub-analyzers and sub-synthesizers are coupled as shown, however, those of ordinary skill in the art will now appreciate that any number of sub-analyzers and sub-synthesizers may be used. It should also be noted, and as described above, that although cascade analyzers and synthesizers are here shown, tree-type analyzers and synthesizers may also be used. An input signal X may be decomposed, therefore into any number N of signals. In general, and as mentioned above in conjunction with FIG. 1, the decomposition procedure performed by the analyzer and thus the number of coupled sub-analyzers may be preferred to cease when the Nyquist frequency of the Nth signal $V_N$ is below the known lower cutoff frequency of the input signal X.

In general operational overview of the signal encryption circuit 32, the input signal X, which may be for example a voice signal, is fed to the analyzer input port 33a' and decomposed by the analyzer 33 in the manner described above in conjunction with FIG. 1. Here, the input signal X is decomposed into signals $V_1$, $V_2$, $V_3$, $V_4$, $V_5$, and $W_1$, $W_2$, $W_3$, $W_4$ and $W_5$ as shown. To encrypt, the random number generator 34, which may be provided for example as a digital random number generator, feeds an encryption signal to each of the signal paths of the residuals, $W'_1$–$W'_5$. The value of each of the residuals, $W'_1$–$W'_5$ are thus modified to correspond to signals $E_1$–$E_5$.

As shown here one method for encrypting the residuals $W'_1$–$W'_5$ is to provide a logical exclusive or (XOR) operation between the sign of the residuals $W'_1$–$W'_5$ and a logical variable having a value corresponding to a logical one (as shown). Alternatively, another method of encryption may be provided by adding several individual secret binary bit streams to one or all of the residuals W'. The residual signals W' are generally provided having a relatively low power level and thus the residual signals $W'_1$–$W'_5$ may appear simply as noise signals (i.e. "buried" in noise) by either or both of the above mentioned encryption techniques. Other methods of encrypting well known to those of ordinary skill in the art may also be used including permutation of channels and substitution of symbols. It should also be noted that alternatively each of the signals $V_1'$–$V_5'$ may be encrypted or a combination of the signals $W_K'$ and $V_K'$ may be encrypted.

It should also be noted that the signal encryptor 32 may be modified to include digital cipher feedback, which is common in the encryption art. To provide digital cipher feedback in the present invention, each of the 5 XOR outputs from the analyzer should be fed back to the inputs of 5 separate secret random number generators (not shown) in the manner of the data encryption standard (DES) for encryption.

It should also be noted that any means well known to those of ordinary skill in the art for providing random digital numbers including but not limited to the DES, with or without cipher feedback may be used. Furthermore, other methods of deriving and using the random numbers to modify the value of the residuals W' including but not limited to additive noise techniques and the like which do not use the XOR function may also be used.

The encrypted signals $E_1$–$E_5$ are subsequently coupled to corresponding ones of the analyzer output ports 33a–33f and then fed to the synthesizer input ports 36a–36e along with an unmodified signal V5 fed to input port 36f. The synthesizer 36 employs Equations 3 and 4 to reconstruct the signals $E_1$–$E_5$ fed thereto to provide a reconstructed output signal Y which may be transmitted on a communication channel (not shown) for example.

A receiver (not shown) receives the transmitted signal and analyzes the signal to recover the signals V5 and $E_1$–$E_5$. The receiver subsequently decrypts the signals $E_1$–$E_5$ to recover the signals $W_1$–$W_5$ and resynthesizes to get the original signal X.

The synthesizer 36 reconstructs the signals $E_1$–$E_5$ such that the resultant reconstructed signal X' provided at the synthesizer output port should not occupy more than the Nyguist bandwidth. Thus it is possible to have the sampling frequency of the highest frequency encrypted stage correspond to twice the upper cutoff frequency of the transmission channel.

The reconstructed encrypted signal X' provided at the synthesizer output port will of course have a different (noise-like) power spectrum and a different average total power due to the additive noise introduced. The input signal power may be diminished to restrict the total channel power. Means for restricting the total channel power may include means for transmitting the power factor to the receiver by using the amplitude of pilot tones which may be used to synchronize the decryptor and an ADC. These pilot tones may be used to derive the ADC clock by a phase locked loop for example and may be provided as explicit narrow band tones or, alternately the pilot tones may be provided as a secret coded sequence added to the residual W' to hide the true value of the residual. The receiver would correlate the appropriate residual in order to establish time synchronization. Specific coded sequences (such as the GOLD codes and JPL ranging codes) having suitable correlation properties required for acquiring synchronization by this method are known in the art of spread spectrum communications.

Furthermore the encryptor recovers the signal out of the receiver substantially exactly like the original input signal except for the presence of noise from the channel and noise-like fluctuations due to imprecise timing synchronization of the ADC converters in the transmitter and receiver ends.

The signal encryptor may also include a means for line equalization (not shown). Such means are well known to those of ordinary skill in the art of modem design. Variations in line loss with frequency (tilt) and phase shift may be compensated by adaptive filtering and often includes a precursor burst of known energy to set the filter parameters and a means for periodically modifying the equalizer coefficients based on a measure of the quality of the received signal.

It should also be noted that if in the signal encryptor 32 the value of the input signal X is set to zero, then the signal encryptor output signal X' would correspond to random noise generated by the encrypting random number generator. Thus in this case the signal encryptor 32 acts as a broadband random number generator. Thus, the signal encryptor may be used as a generator to provide a signal on the line which may be used in the line equalization process.

Furthermore the analyzer may be used to measure the channel response of each channel. If the synthesizer, thus provides a test signal on each channel the analyzer may measure the response on each channel to determine the loss on each channel. Thus the analyzer and synthesizer may be used to provide a method of line equalization.

As will be described below in conjunction with FIG. 4, this concept may be further refined to only using a synthesizer at the sending end and only an analyzer at the receiving end.

The delay in a tree may correspond to

Delay=$2^L-1$ where L is the number of levels in the tree. Thus the tree process in a five level tree introduces a relatively short delay of only 31 samples. Likewise, for a cascade system, it is believed that the delay in each signal path is provided by the above equation where L now corresponds to the number of stages in a particular path of the cascade. Since human hearing is sensitive to echoes from a hybrid coupler found in most transmission media, this short delay is a desirable feature.

Figure 3:
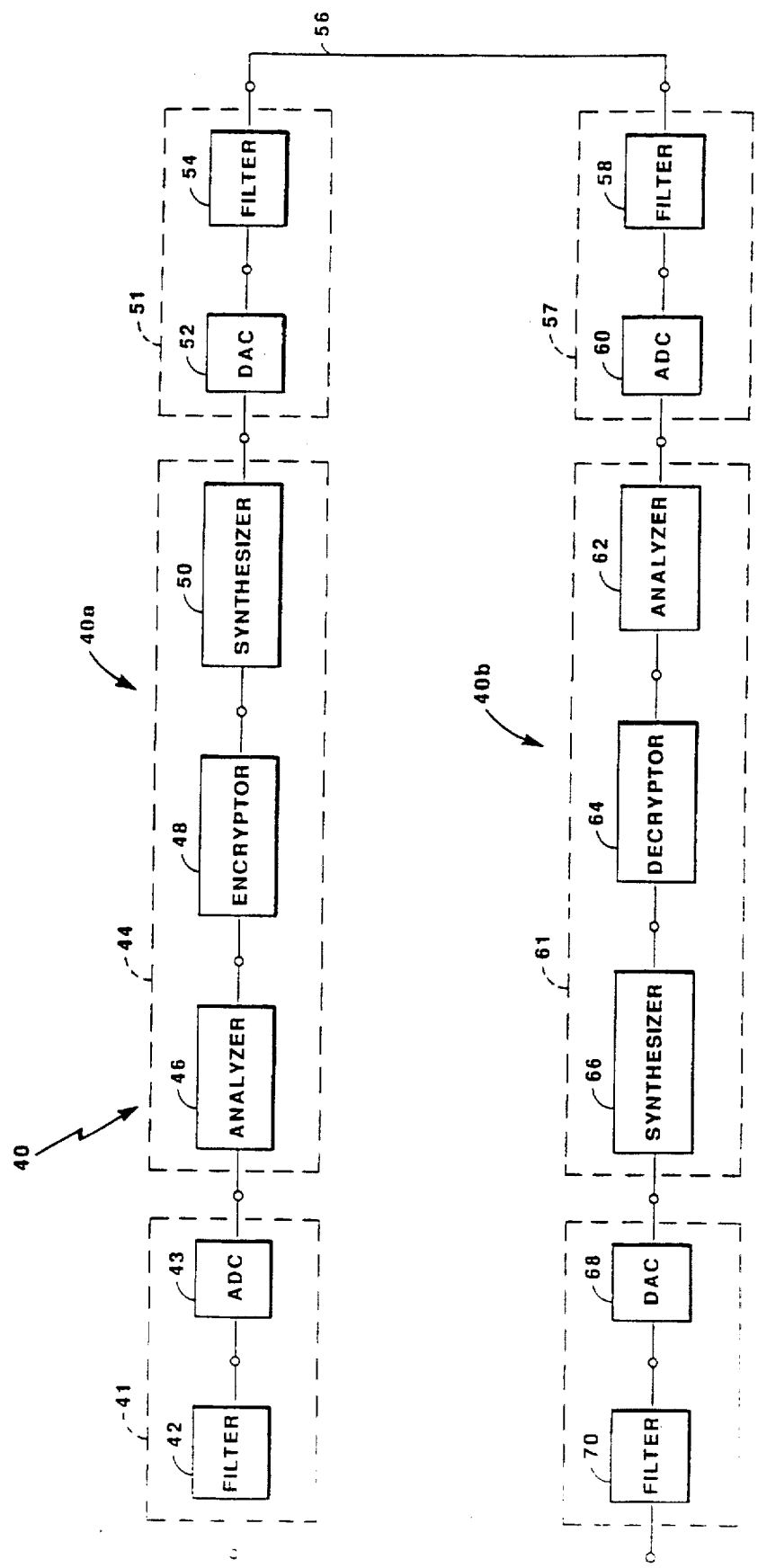
FIG. 3 is a block diagram of a transmitting and receiving system for the transmission and reception of secure signals.

Referring now to FIG. 3, a transmitting and receiving system 40 for the transmission and reception of secure signals includes a transmitting portion 40a and a receiving portion 40b. The transmitting portion 40a includes a signal conditioning circuit 41 including an input filter 42 having appropriately selected filter characteristics preferably selected to provide Nyquist filtering to an analog signal fed thereto. The filter 42 couples the analog signal to an analog-to digital converter (ADC) 43 which converts the received analog signal into a digital signal representative of the analog signal.

The analog signal fed to the ADC 43 input port may be fed through an amplifier or other preconditioning circuits (not shown) and then fed to the ADC 43. Preferably signal preconditioning circuits such as low noise amplifiers and buffer amplifiers are relatively wide-band amplifiers and are further characterized as having relatively low levels of phase dispersion over the bandwidth of the amplifier. That is, the amplifiers impart to the amplified output signal a substantially equal phase shift to the amplified output signals therefrom at least over the bandwidth of the transmitted signal. Further, the sampling rate of the ADC 43 is preferably greater than twice the Nyquist sampling frequency (i.e. greater than twice the frequency of the highest frequency component signal in the input spectrum).

The ADC 43 converts the signals provided from the filter 42 in accordance with the predetermined sampling rate to provide a stream of digital words. At the output of the ADC 43 such stream of digital words are fed to a signal encryption circuit 44.

The signal encryption circuit 44 includes an analyzer 46 which appropriately decomposes the signal fed thereto into a plurality of signals, an encryptor circuit 48 which encrypts the decomposed signals and a synthesizer 50 which combines the signals fed thereto into a reconstructed encrypted signal. The signal encryption circuit 44 may be of the type and operate in a manner similar to the signal encryption circuit 32 described above in conjunction with FIG. 2.

The encryptor circuit 44 may encrypt the signal by adding a secret number to the residue, W' with the value of the secret number known only to the sender and receiver. Such an addition may typically be done modula 2. That is, by providing a logical exclusive-or (XOR) function big by bit to the residual signal. Such addition may also be accomplished by simply adding modulo the actual word size of the data.

The encryptor 48 may be provided as a secret number generator which may be of a type that provides a different secret number based on the number of times it is requested to do so, or it may be of the type that the output depends only on its input. The latter type may often be self-synchronizing. The former type may suffer loss of sync between the encryptor and the decryptor if the receiver, for any reason, loses bit or word synchronization with the transmitter.

The encryptor 48 may provide permutation operations among the several channels or alternatively the encryptor 48 may provide substitution operations or alternatively still the signal encryptor may provide the logical or operation described above in conjunction with FIG. 2.

The signal encryption circuit 44 feeds the reconstructed encrypted signal to an input port of an output signal conditioning circuit 51 which includes a digital-to analog-converter (DAC) 52 which may be provided as a logarithmic ADC for example, which converts the encrypted bit stream fed thereto to an analog signal representative of the encrypted bit stream. The analog signal is subsequently fed to an output filter 54 having appropriately selected filter characteristics as described above. The filter 54 couples the signal fed thereto to a first end of a transmission channel 56, which may be provided for example as a telephone line. A second end of the transmission channel 56 is coupled to the receiving portion 40b of the transmitting and receiving system 40.

In general overview, the receiving portion 40b receives a secure signal fed thereto and decrypts the signal to provide a clear text signal at an output port. The receiving portion 40b of the transmitting and receiving system 40 receives the encrypted signal through an input signal conditioning circuit 57 at an input port of an input filter 58 having appropriately selected filter characteristics. The input filter 58 couples the signal to an ADC 60 which converts the analog signal to provide a stream of digital words in the same manner as described above. The filter 58 may be provided having a low pass filter frequency cutoff characteristic corresponding to one-half the sampling frequency of the ADC 60. The ADC 60 feeds the stream of digital words to a decryption circuit 61 which includes an analyzer 62 which decomposes the signal fed thereto into a plurality of signals and a decryptor circuit 64.

If the encryptor circuit 48 in the transmitting portion 40a of the system used a secret number to encrypt the signal, the decryptor circuit 64 subtracts the secret number, to recover the original data.

The decryptor-synthesizer combination 64, 66 performs the inverse operation of the encryptor-analyzer 48, 46 at the transmitter and feeds the decrypted and appropriately recomposed signal to a digital to analog converter (DAC) 68. The DAC 68 provides an analog signal corresponding to the bit stream fed thereto and feeds the analog signal to a receiver output filter having appropriately selected filter characteristics as described above.

If the analyzer and synthesizer are provided as the cascade type or the tree type, then as mentioned above, the number of levels may typically be determined by the lower limit of the input signal bandwidth. Thus a practical requirement for most applications may be to dispose a pre-filter (not shown) having a high-pass or band pass filter characteristic prior to the signal conditioning circuit 41.

In any case, whether such a filter is or is not provided, the system of sender and receiver may not recover a signal having a bandwidth which exceeds the bandwidth of the communications link 56. In applications where the communication link 56 is provided by electromagnetic or sonic energy, the bandwidth of the link generally has practical limits, for example a single television (TV) channel.

Referring now to FIG. 4 a signal encryption system 72 receives an analog signal at an input port and filters and converts the analog signal to a first stream of bits via a filter 74 and an ADC 76 in the same manner as described above in conjunction with FIG. 4. Here, the bit stream is fed from the ADC 76 to a signal encryptor 78. Here the signal encryptor 78 receives the signals directly on separate signal channels. A random number generator 80 is coupled to the signal encryptor 78 and feeds a stream of random bits to the signal encryptor 78. The random stream of bits modifies the first bit stream to thus provide an encrypted signal. The signal encryptor 78 combines the signals to thus provide á reconstructed encrypted signal at an output port.

The encrypted signal is subsequently fed from the signal encryptor 78 to an input port of a DAC 82 which converts the encrypted bit stream to an analog signal. The analog signal is coupled through a filter 84 which provides an appropriately filtered signal to a first input port of a signal combining circuit 86.

A timing circuit 87 includes a timing signal generator 88 for providing a timing signal. The timing circuit 87 may provide to a receiver 92 either an analog or a digital timing signal and thus an optional ADC 90 is here shown coupled between the timing signal generator 88 and the summing circuit 86. If the DAC 90 is included in the timing circuit 90 then the timing signal is fed through optional signal path 91' to the digital input port of the DAC 8d. If the ADC 90 is omitted then the timing signal is fed through signal path 91 to the summing circuit 86 as shown.

It should be noted and those of ordinary skill in the art will recognize that implicit in the recovery of information at the receiving end of an analog communications link using the analyzer and synthesizer building blocks operating according to the above equations is the need to synchronize the ADC in the transmitting portion of the system and the DAC at the receiving portion of the system such that the transmit and receive portions of the system agree on the exact time of sampling. Large inaccuracies in synchronization will result in gibberish out of the receiver. Small statistical jitter in the timing synchronization will have the same effect as noise on the link.

Timing and synchronization schemes are known to those of ordinary skill in the art. In one method for example, an oscillator locked to (i.e. derived from) the sampling rate of the sending portion may be sent overt he link. The received oscillator signal may be used to derive (via phase locked loop techniques for example) the receiver's clock signals for sampling. As mentioned in the secure transmitting and receiving system 40 (FIG. 3) the timing information may be applied to the encryptor and decryptor respectively.

In those systems employing cascade-type or tree-type analyzers and synthesizers (FIGS. 1A–1D) two timing signals may be required because the inherent delay in the sending portion of the system effectively defines "words" rather than just signal bits that should be synchronized. Such word synchronization may be achieved by providing a second sender oscillator which may be locked to the first oscillator (alternatively, the first oscillator may be locked to second oscillator thus requiring only a word synchronization) and operating at a rate depending upon both the number of levels in the cascade and on the type of system being provided i.e. a signal encryptor, a signal compressor, or a modem. Such oscillator signals may occupy the same bandwidth as the system information, since they may be subtracted out by the known techniques for removing a signal of known frequency and constant amplitude. In practice these two oscillators should preferably provide signals having a particular frequency and a particular amplitude. In practice these two oscillators should preferably be locked to signals having frequencies corresponding to those frequencies which define the extreme upper and lower band edges of the frequency bandwidth of the system information (and the system information while still maintaining the requirement that will not exceed the band limits of the link.

One method for removing an interfering signal (namely, the received oscillator signal) from the accompanying system information signal is to form a feedback loop that subtracts out an amount of the known (as received) frequency until the resulting difference no longer contains any narrow band correlation to the known (received) oscillator. The operation of a phase locked loop includes multiplication of an input signal with a local oscillator (which, in turn, is locked to the received timing signal) and then integrating the result with a low-pass filter.

Another method for timing synchronization between the sending and receiving portions of the system will be described below in conjunction with FIG. 7.

Figure 5:
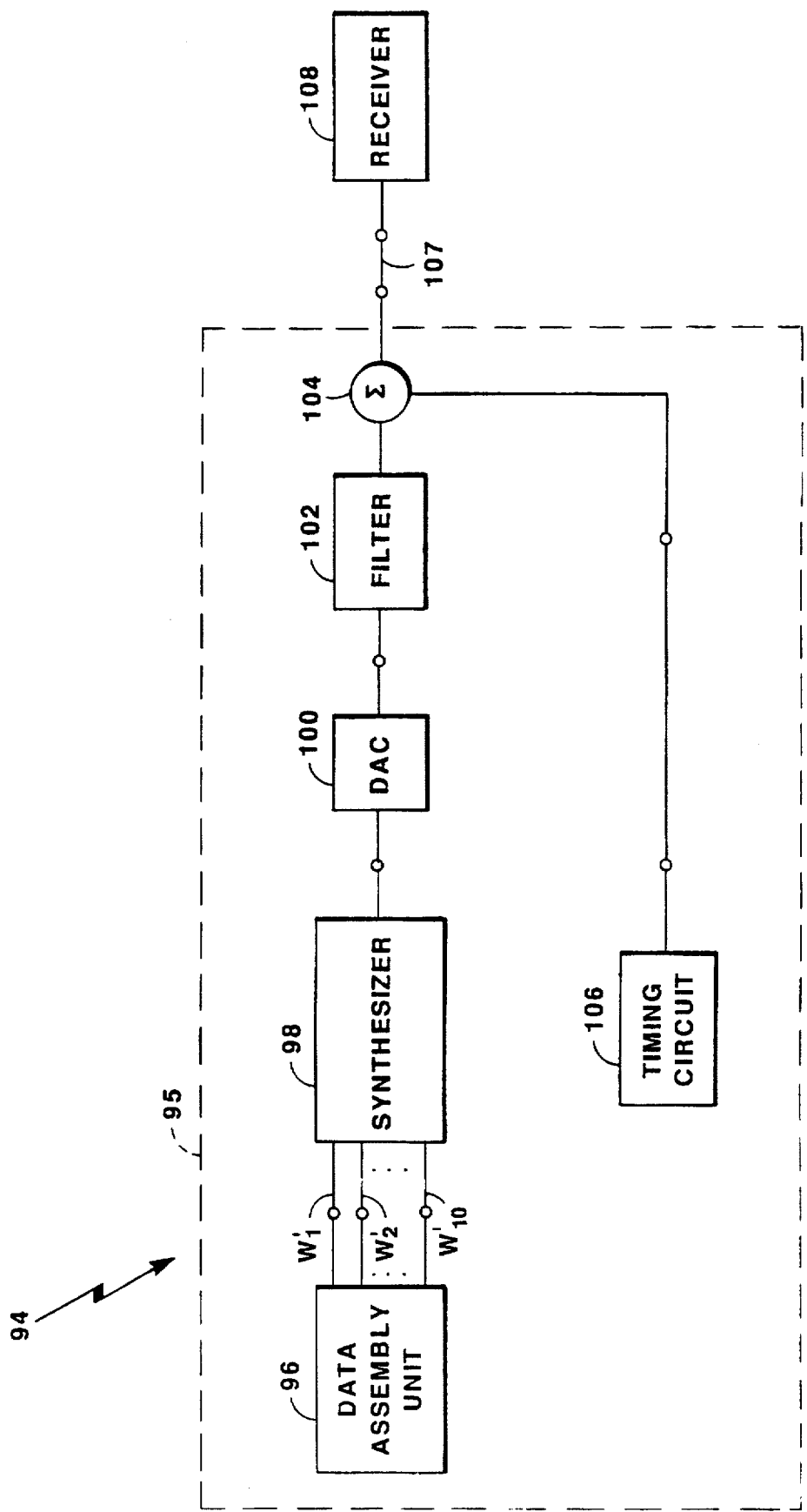
FIG. 5 is a block diagram of a modem.

Referring now to FIG. 5 a system for transmitting digital data over an analog medium 94 includes a modulator-demodulator (modem) 95 here only a modulator portion of the modem 95 being shown. The modem 95 includes a data assembly unit 96 for forming digital data into frames or bytes having a predetermined length appropriately selected for data transmission. The data assembly unit feeds the data to the input ports of a synthesizer 98 which forms the data into a bit stream in accordance with the technique of the sub-synthesizer 20 described above in conjunction with FIG. 1. That is, here digital data to be transmitted is applied to the residual inputs $W'_1 \ldots W'_N$ of the synthesizer. This data may be encrypted by a random number generator (not shown) which provides an encrypting sequence which may or may not be a secret sequence.

The synthesizer 98 feeds the bit stream into an input port of a DAC 100, which may be provided having a nonlinear response characteristic, which generates an analog signal corresponding to the bit stream fed thereto. In accordance with the Nyquist sampling theorem procedure, the digitized samples out of the sender should be converted via the DAC 100 to an analog signal representation of the digital signal fed thereto. The analog signal is subsequently filtered for anti-aliasing with a filter 102 having a low pass filter characteristic and preferably having a relatively steep filter skirt and a cutoff frequency corresponding to one-half the sampling rate frequency. The filtered signal is coupled to a first input port of a summing circuit 104. A timing circuit 106 feeds a timing signal into a second input port of the summing circuit. The summing circuit thus superimposes the two analog signals fed thereto. Alternatively, a timing signal may be transmitted via the input to the synthesizer 98.

The superimposed analog signal is transmitted over an analog transmission link 107 (e.g. a telephone line) to a receiver 108 where the timing signal may be used to provide timing data for the receiver such that the bit stream may be recovered from the analog signal. It is believed that a modem constructed in accordance with the present invention may operate at or near the maximum data rate theoretically possible for a transmission link based on signal to noise ratio of the link and Shannon's Law.

At the receiver 108, substantially all noise in the frequency range above one-half the receiver sampling rate frequency should be filtered with a filter having a low-pass filter characteristic and having a cutoff frequency above one-half the receiver sampling rate frequency. If the transmission link 107 is provided as a transmission line over which signals having a frequency between 400 Hz and 3200 Hz may be transmitted then the input signal may appropriately be sampled at a sampling rate typically of about 6400 bps.

A single tone having a frequency typically of about 3200 Hz may be provided by the timing circuit and added to the transmitted signal and phase-locked at the receiver as one means of synchronizing a receiver ADC clock. Since the tone may be provided having a known amplitude and frequency, it may be subtracted rather than filtered out at the receiver and thus there is no resultant loss of data.

Likewise a signal tone having a frequency typically of about 400 Hz may be used to provide a word synchronization for formulating the word comprising the input to all the cascade levels. Signals in the frequency range below 400 Hz may be used for signalling for line turnaround in a semi-full duplex modem, for sending reverse channel data and network information. Bits per cascade level may be increased until the maximum power per unit of data which may be transmitted and Shannon's limit are reached.

Furthermore error correcting codes such as M of N codes (M redundant bits out of N) and scrambling signals may be applied to the input data words as is known to those of ordinary skill in the modem art.

Figure 6:
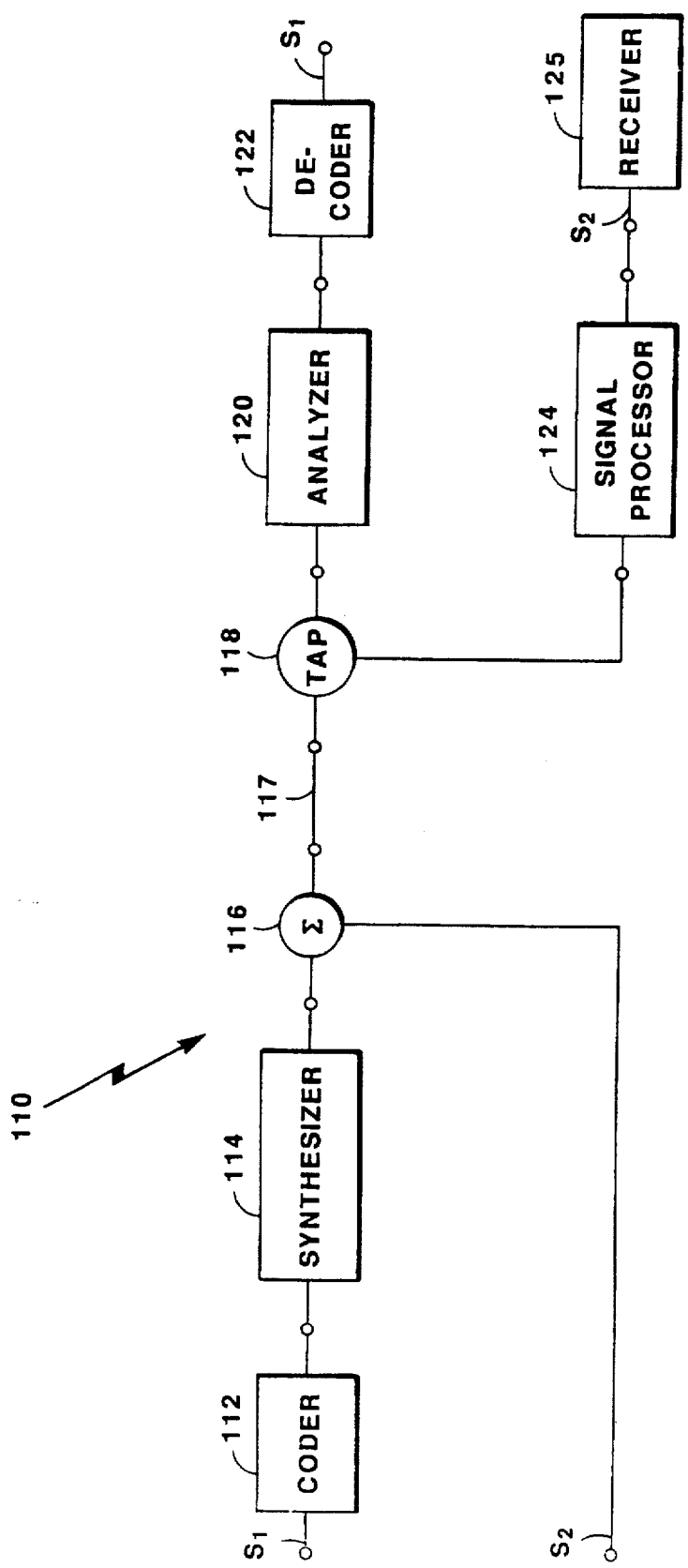
FIG. 6 is a block diagram of a coded modem.

Referring now to FIG. 6, a coded modem 110 using direct sequence coding, in which each data word modulates all the bits in a sequence of code bits, more than one signal may share the link simultaneously. A shared signal $S_2$ may be provided for example, as a voice signal, television (TV) signal or facsimile (FAX) signal or alternatively the shared signal $S_2$ may be provided from additional modems of the same type operating with orthogonal code sequences.

The coded modem 110 includes a coder 112 for providing the coding operation. The coded signal is fed to a synthesizer 114 which provides a relatively broadband signal having a noise-like frequency spectrum to an input port of a summing circuit 116. A sharing signal may be fed to a second input port of the summing circuit. The summing circuit couples the signals fed thereto to a first end of a transmission line 117.

At the demodulator portion, a signal tap 118 couples a portion of the signal transmitted over the transmission line 117 to an optional signal processor 124. The signal processor 124 feeds processed signal to a receiver 125.

The codes of the coder 112 are selected to have good auto-and cross- correlation properties, and thus the modem data may be recovered even when the modem operates at low power relative to the shared signal.

To a sharing device, the receiver 125 which may be provided as a TV receiver for example, the modem signal may appear to be a small random background noise. However if the shared signal is coupled to the TV receiver 125 through the signal processor 124 containing the code sequences, C, then most or substantially all of the modem "interference" in the TV receiver 124 may be removed by known techniques for cancelling correlated noise.

The modem 110 includes the coder 112 for providing a coding operation C, and a decoder 122 for providing a correlation operation, C^. In a correlation operation, data is recovered by digitally integrating the product of the received sequence with the stored code, C. A signal sharing the link will typically tend to integrate to near zero since the shared transmission is uncorrelated to the chosen code, C. The optional interference cancellation operation for the sharing signal is performed by the signal processor, 124.

Figure 9:
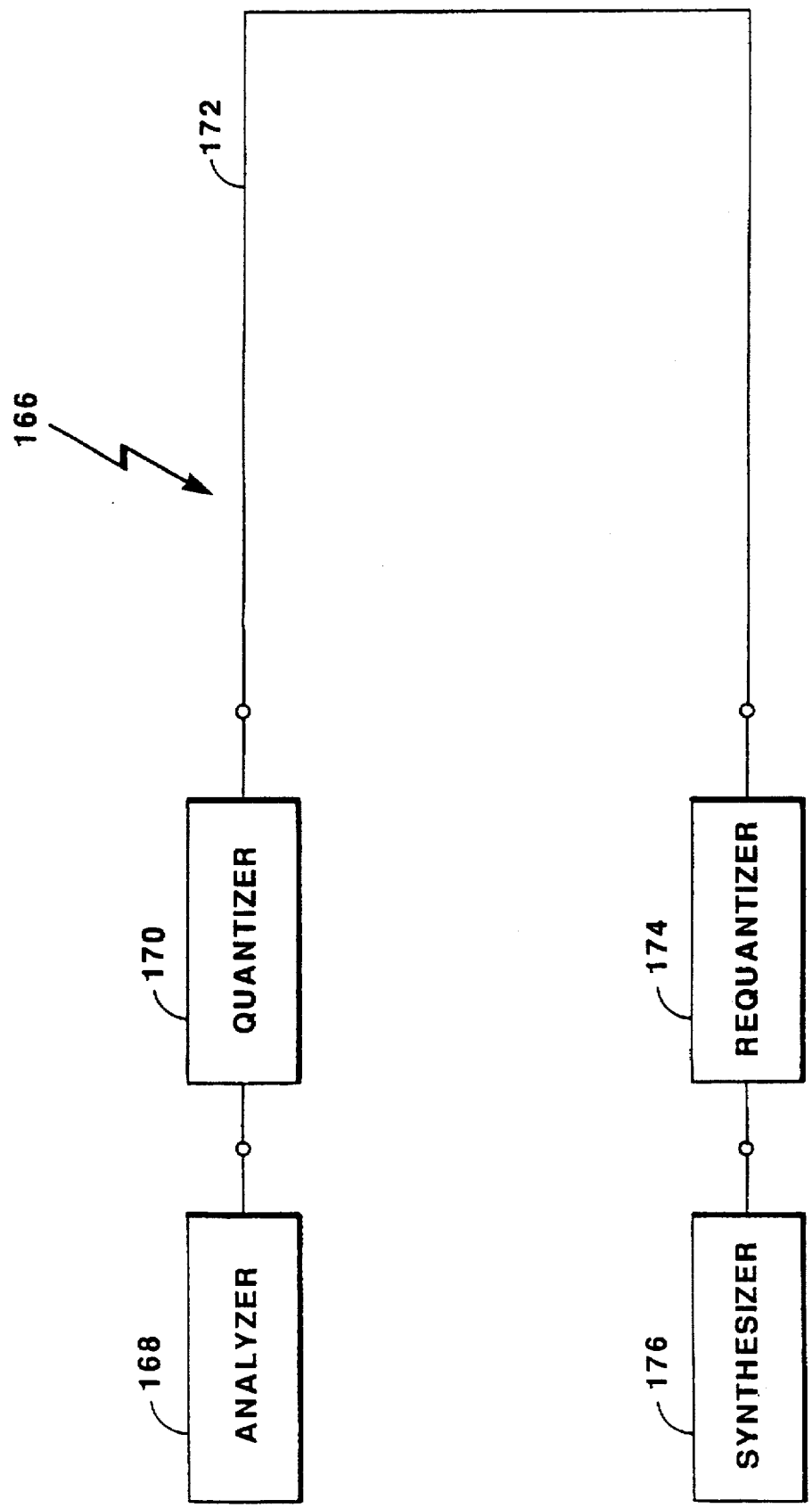
FIG. 9 is a block diagram of a signal compression system for transmitting and receiving signals over a digital link.

A method for timing synchronization between the sending portion and receiving portion of the system 110, is now described, however before describing the method it should be noted that although the method may be more clearly explained within the context of the coded modem, the method may also be applied, with minor variations, to other systems including the signal encryption systems described above in conjunction with FIGS. 2-4 above and signal compression systems to be described in conjunction with FIG. 9 below.

At least one of the signals, $W'_k$, is forced to be a sequence having known correlation properties. In a cascade synthesizer, since "word" synchronization is required, the chosen signal $W'_k$ may preferably correspond to the signal having lowest inband sample rate. It should be noted however, that in a direct sequence coded modem all the $W'_k$s are so coded.

There are many examples of suitable code sequences such as JPL, GOLD codes and Walsh codes. For illustration and not by way of limitation, the Walsh codes (also known as Hadamard codes) are described. The kernal for a Walsh code is provided as:

+1+1

+1−1

Higher order codes are found by substitution of a level into the kernal as shown

```
+1 +1   +1 +1
+1 -1   +1 -1
+1 +1   -1 -1
+1 -1   -1 +1
``` which may be compactly expressed as:

```
+1 +1 +1 +1 = code 1
+1 -1 +1 -1 = code 2
+1 +1 -1 -1 = code 3
+1 -1 -1 +1 = code 4
```

Many other codes, (such as the GOLD codes) are known that have "good" correlation properties. By correlation is meant multiplication and integration which in a two valued binary case (+1,-1) reduces to just the vector dot product of the sequences. A dot product between two identical codes provides a predetermined output (i.e. (Code 1) DOT (Code 1)=4) However, a dot product between 2 unlike codes would provide an output of zero (i.e. (code 1) DOT (codes 2,3,4, )=0) Similarly, this relationship also holds true for each of the other 3 codes. Thus, these are orthogonal codes.

Non-orthogonal codes having a large auto-correlation and a small cross-correlation may also be suitable, and some of such codes are known to be particularly good for fast acquisition of synchronization in a sliding correlator. An example of a sliding correlator may be made with code 3. If word sync is unknown (assume for this discussion that bit sync is known) then one of four possibilities may occur in the receiver's correlator: they are

```
+1 +1 -1 -1   assumed timing of the receiver's word clock
+1 -1 -1 +1   received pattern   possibility 1
-1 -1 +1 +1                      possibility 2
-1 +1 +1 -1                      possibility 3
+1 +1 -1 -1                      possibility 4.
```

Correlation, that is the dot product of the receiver's code with each of the 4 possible patterns reveals that the correlator will compute a dot product of 0, -4, 0, and +4 for each of the 4 possibilities, respectively. However, only the correct word synchronization (i.e. namely possibility 4) will have large positive (i.e. +4) correlation. By sliding the receiver's assumed clock, bit by bit relative to the incoming signal, and performing the correlation, the receiver may thus find word synchronization, hence the name "sliding correlation". Thus, it should also be noted that the maximum correlation will occur when both the word and bit synchronization are correct.

To accomplish the foregoing method of synchronization, the residual, W', of the lowest frequency stage in the sender's cascade may be arranged to have code 3 define its value (or at least the sign of W' would follow code 3). The preceding discussion illustrates some of the many ways receiver synchronization may be achieved. In some system applications such as encryption, the timing from the receiver may also drive other building blocks, such as a decryptor. In full duplex operation, a clock in the receiver may also be used for transmission from that end such that there is only one master clocking the system.

Assuming that bit and word synchronization have been established in the modem 110, then an incoming data bit may be expressed as corresponding to either +1 or -1. If that data bit multiplies one of the codes, code 2 for example, then the resulting 4 bit sequence is either code 2 or code 2 with the sign of each bit reversed. If that sequence is applied to one of the W' inputs of a cascade or tree synthesizer as a sequence of bits, then the receiver's analyzer will recover that W' and may correlate with code 2 to get either a large positive or a large negative number which will determine the receiver output as a +1 or a -1 respectively. Here for ease of explanation, an example using a single bit has been described. In practical systems of course, such operations would typically be performed on digital words having a plurality of bits.

The application of the coded data bits to the W' inputs of a cascade synthesizer is somewhat complicated by the fact that each stage in the cascade operates at a different sampling rate. Such an operation may be more easily accomplished in a tree synthesizer since input data may be assembled into words and applied all at once at the frequency of the lowest synthesizer stage. For a tree synthesizer, the transmitter's power would also be distributed more evenly across the link bandwidth—a preferred and efficient case. Spreading the transmitter's energy evenly across the link bandwidth is a prescription for possibly achieving operation at the maximum limit of the link.

Several coded modems of the type described in FIG. 6 may operate simultaneously over the same link, within the constraint of total link power. Each modem should use a different orthogonal code. For example, a code 3 modem would not interfere with a code 2 modem. It should be noted that the number of modems that may share a link using the 4 bit Walsh codes described above is more than four since each modem may have a different and unique combination of codes on each of its independent residual inputs, provided certain groups of modems don't operate at exactly the same time. It should also be noted that these multiple modems may simply be provided as different orthogonally coded data bits.

A two wire full duplex modem may be provided by using a companion set of almost orthogonal codes. The Walsh codes identified as code 1 through code 4 above, and their bit-wise complement, are only one half of the 16 possible combinations of 4-bits. As shown below the remaining combinations also form another set of mutually orthogonal vectors, below numbered as c5 through c8. This second set of 4 vectors is not orthogonal to the first set. It can be described as "nearly orthogonal" because the dot product of any member of set 1 with any member of set 2 is always half the length of the vector; and of course the dot product of any member with another of the same set is always 0 except that the product with itself is always equal to the length.

```
MASTER (set 1)    SLAVE (set 2)
c1 = + + + +      c5 = + - - - = c1^
c2 = + - + -      c6 = + + - + = c2^
c3 = + + - -      c7 = + - + + = c3^
c4 = + - - +      c8 = + + + - = c4^
```

The master group is orthogonal and the slave group is also orthogonal, however the cross group correlation is -2 for the dual and +2 for any other cross term. One end of a transmission link may transmit signals using the master set of codes and a second end of the transmission link may transmit using the slave set of codes.

It should be noted that the same benefits may be realized by using the matrix transformation approach to provide the synthesizer 114 and analyzer 120.

Thus to provide full duplex operation, the modems at each end of a link can be assigned to use set 1 or set 2 as Master and Slave. If the Master used only codes 1 and 2 and the Slave used codes 3 and 4 then all echo signals would be totally cancelled by the orthogonality but the data throughout for each modem would be half of the rate possible by using the arrangement described above based on the two sets of codes.

Furthermore, coded modems of the type described in conjunction with FIG. 6 may coexist with other signals on the link since the correlator will provide little or no output signal. Longer code sequences may improve this effect at the expense of lower data throughput. Certain codes, other than the Walsh codes, may be better able to exploit this characteristic for multiple access applications.

Figure 7:
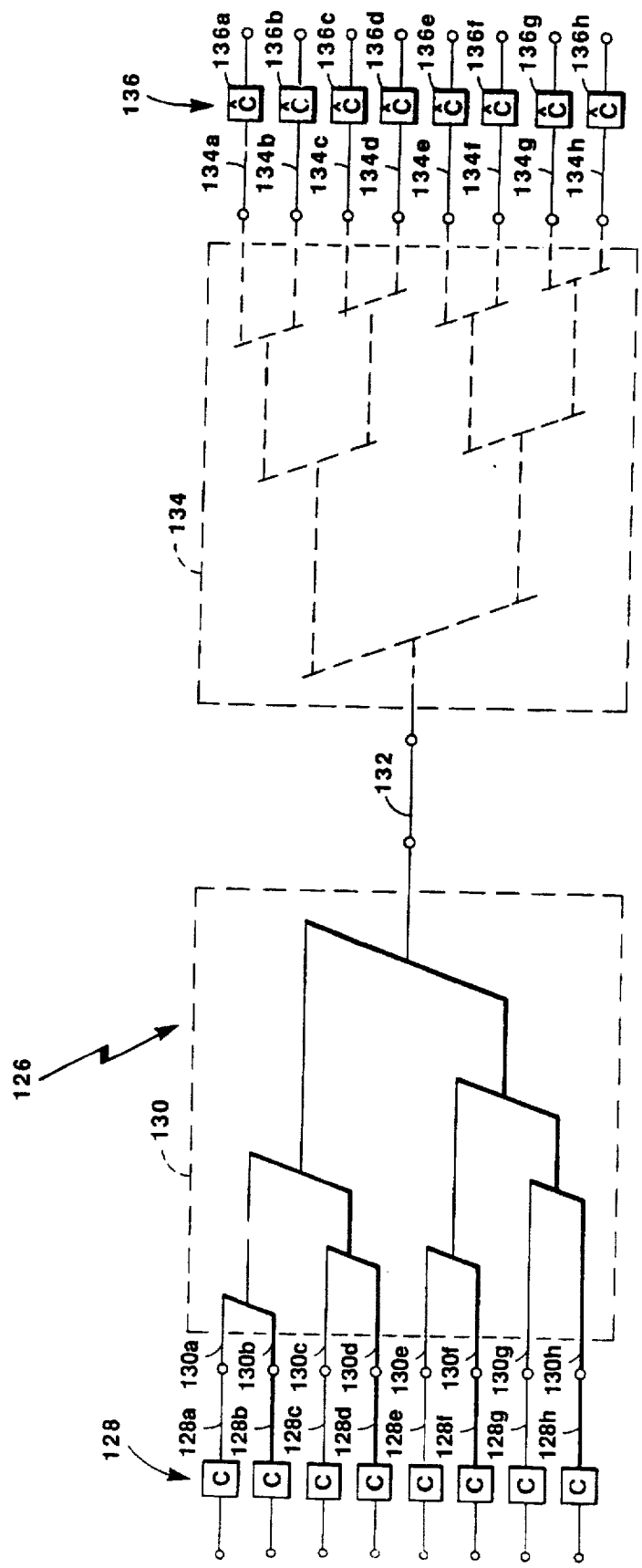
FIG. 7 is a block diagram of a coded tree modem.

For a modem 126 as shown in FIG. 7, it is possible to use direct sequence code division multiplexing to excite the sub-stages of the synthesizer cascade. As described above, such a procedure would permit clock recovery based on a sliding correlation. It also allows data multiplying the code sequence (as is done in direct sequence spread spectrum) to be recovered at a receive end using correlation techniques.

One application for such a coded modem would be to take advantage of the processing gain of the correlation receiver to recover a low power signal from the modem buried in a large "jamming" signal. Practical examples of jamming signals include voice (hence data may be sent as 'noise' under the voice), television (hence high definition digital information may be sent in the same channel as standard video to maintain compatibility), code division multiplexing and two wire full duplex FDX. The disclosed technique is an improvement on those methods because the modem utilizes the bandwidth more efficiently than heretofore.

Furthermore, the modem described herein, being a modulator (the synthesizer) and a demodulator (the analyzer) may also take the form of a baseband RF or soundware transmitter modulator and receiver (or above baseband except for the limits of ADC's). Such a receiver may have application in receiving digital High Definition TV (HDTV).

Coded modems of the type described above in conjunction with FIG. 6 and to be described in conjunction with FIG. 7 below may use Walsh codes to pre-encode data which is applied to the w' and v' inputs. Because the synthesizer itself uses Walsh codes, if implemented by the rotation matrix, it should be pointed out that these two coding schemes are independent. For example, the code length for the data inputs need not be the same as the number of synthesizer outputs. The number of outputs is equal to the length of the synthesizer rotation operators. Thus by applying the matrix method to the coded modem, the coded modem becomes in essence a twice coded modem.

Referring now to FIG. 7, a coded tree modem 126 includes a plurality of coder circuits 128a-128h coupled to corresponding ones of a plurality of input ports 130a-130h of a tree-type synthesizer 130 operating in accordance with the principles described above in conjunction with FIG. 1. The synthesizer output port is coupled through a link 132 to an input port of a tree-type analyzer 134 also operating in accordance with the principles described above in conjunction with FIG. 1. A plurality of decoder circuits 136a-136h are coupled to the analyzer output ports 134a-134h to decode the coded signals fed thereto.

In principal the coded tree modem 126 operates such that the coder circuit performs a coding operation of multiplying a data word times an orthogonal code C. The decoder performs a correlation operation here denoted C^. It should be noted that the final V' input sequence on line 130h may be set to zero if it is assumed to be below a frequency corresponding to the lower frequency limit of the passband frequency of the link 132.

Figure 8:
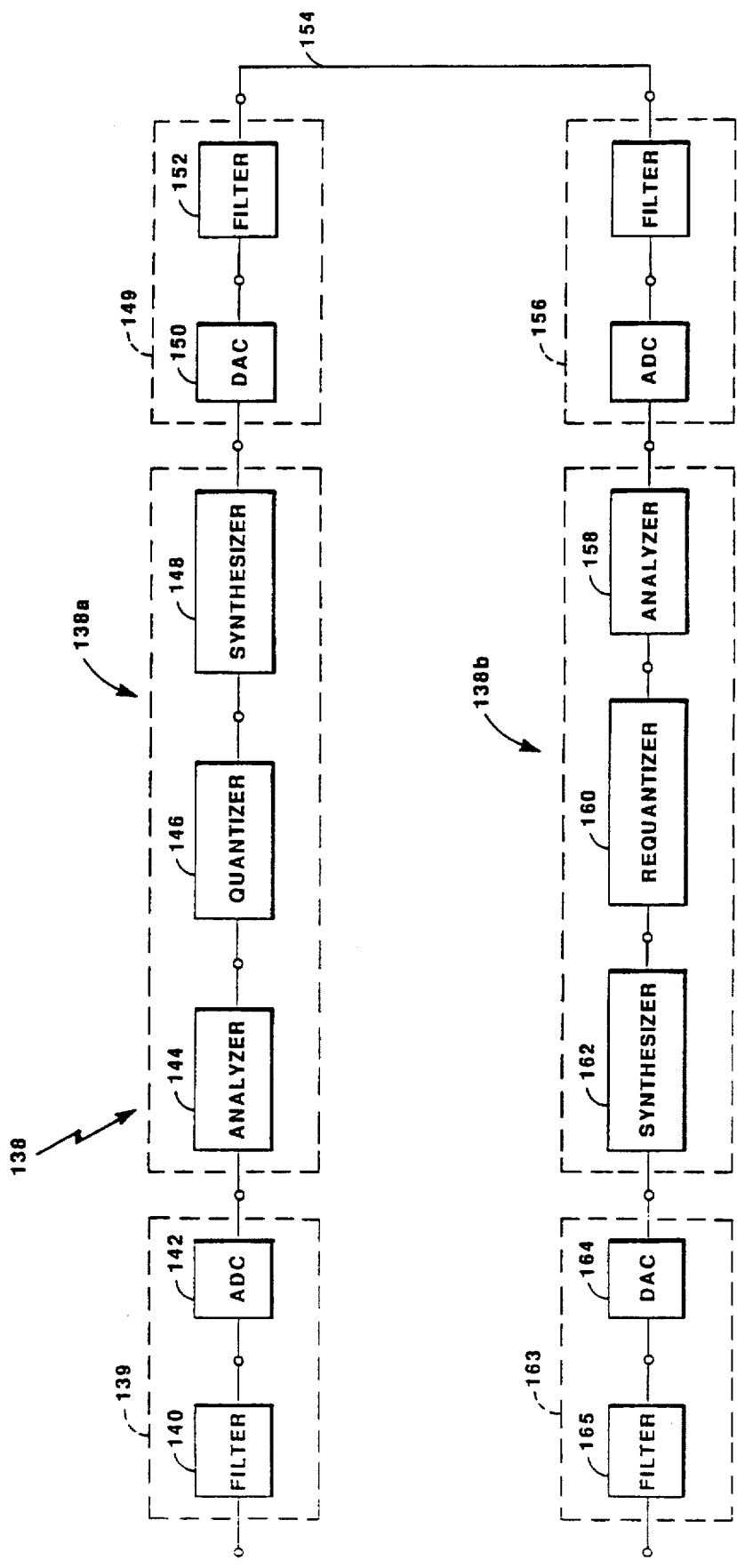
FIG. 8 is a block diagram of a system for receiving and transmitting compressed signals.

Referring now to FIG. 8, a system for transmitting and receiving compressed signals 138 includes a transmit portion 138a having an input signal conditioning circuit 139, which here includes an input filter 140 and an ADC 142. The filter 140 and ADC 142 are selected to operate in accordance with the techniques described above to provide an appropriate stream of digital words to the first input port of an analyzer 144. A guantizer 146 is coupled between the analyzer 144 and a synthesizer 148. In operation, the signal compressor quantizer 146 maps the residual W'(N) into a new number taking fewer bits to describe. Thus it is a compression operation.

An output signal conditioning circuit 149 includes a DAC 150 coupled to the output port of the synthesizer 148. The DAC 150 receives a digital stream of words and provides an analog output signal representative of the bit stream fed thereto. A filter 152 having appropriately selected filter characteristics couples the analog signal from the DAC 150 to a first end of a transmission line 154.

A second end of the transmission line 154 is coupled to a receive portion 138b of the system 138. The receive portion b includes an input signal conditioning circuit 156, which appropriately filters and converts the analog signal fed thereto to provide an appropriate stream of digital words to the first input port of an analyzer 158. An inverse guantizer 160 (i.e requantizer) is coupled between the analyzer 158 and a synthesizer 162.

In operation, the requantizer 160 remaps to the original bit definition. The compression operation, of course, lowers the information content of the signal and that lost information may not be recovered. In many applications, however, the lost information is redundant or the human observer is insensitive to the level of detail contained in the information discarded by the quantizer and thus little or no signal degradation may be detected.

An output signal conditioning circuit 163 receives a reconstructed digital stream of words from the synthesizer 162 and provides an appropriately filtered analog output signal representative of the bit stream fed thereto to an the output port of the receive portion 138b of the system.

In speech compression processes, bandwidth may generally be reduced by limiting the number of bits devoted to the residual W'. However, an alternative which may provide an increased reduction in bandwidth may be accomplished by first replacing a signal $V_5$ on the cascade channel corresponding to the lowest frequency band with a zero, thus only transmitting the signal $W'_5$. Next, a signal $W'_3$ associated with a cascade channel corresponding to the frequency band in the 700 Hz to 1400 Hz frequency range may be eliminated or coarsely quantized. Furthermore, Huffman coding or codebook vector quantization methods may be used on $W'_2$.

By adjusting the sample rate, the frequency band from 700 Hz to 1400 Hz may be isolated. Since human voice especially in the English language, generally does not include a formant in this range, the cascade channel corresponding to the frequency band from 700 Hz to 1400 Hz may be eliminated (i.e. by setting the residual $W'_3$ equal to zero) with little loss in intelligibility. Similarly, as shown in the Table below, $W'_1$ and $W'_5$ may also be set to zero.

TABLE

| SIGNAL | SAMPLE RATE (samples/second) | FILTER RANGE (Hz) |
|---|---|---|
| $W'_1$ | 5600 | $W'_1$ =0 >>2800 to 3200 |
| $W'_2$ | 2800 | $W'_2$ >>1400 to 2800 |
| $W'_3$ | 1400 | $W'_3$ =0 >>700 to 1400 |

TABLE-continued

| SIGNAL | SAMPLE RATE (samples/second) | FILTER RANGE (Hz) |
|---|---|---|
| $W'_4$ | 700 | $W'_4 >> 350$ to $700$ |
| $W'_5$ | 350 | $W'_5 = 0 >> 175$ to $350$ |
| $V_5$ | 175 | $V_5 = 0$ |

Thus, in this example $W'_1$ through $W'_5$ and $V_5$ are sampled at the rates shown in the Table and it is possible to transmit only the signals corresponding to the residuals $W'_2$ and $W'_4$, for example, which have sample rates of 700 and 2800 baud perhaps less than 2 bits for each residual $W'_2$, $W'_4$ after Huffman coding. Further reduction may also be possible since $W'_2$ may simply be considered as another sampled signal and thus may also be subdivided by multi-resolution analysis to further reduce the bandwidth.

By way of example, if 1.5 bits are used for the 700 sample/second residual and $W'_2$ is decomposed into 1400 samples/second, 700 samples/second, 350 samples/second, 175 samples/second, and 65 samples/second at 1.5 bits each then the total number of bits per second (bps) corresponds to 5085 bps to which should be added overhead bits for frame synchronization. This method is considerably less computationally complex than methods such as Linear Prediction Coding 10 (LPC10) and dynamic Excitation LPC and refinements thereto as are known to those or ordinary skill in the art of voice compression.

Although not here shown, the receiver may be provided having the same form with received signal applied to $V_0$ and the clear output taken from $V'_0$.

In view of the above, those of ordinary skill in the art will now recognize that combinations of the system described above may be created to form, for example, an encrypted data compression system for use on analog links. This may be particularly useful, for example, in those applications such as transmission and reception of high definition television signals in which the amount of digital data to be transmitted exceeds the Shannon Law limit of the link. Thus, in such applications the data may first be compressed by any algorithmic means until the sample rate is consistent with the Nyquist sampling theorem limit of the link and the data may then be applied to one of the modem systems described hereinabove in conjunction with FIGS. 5-7 for example.

Referring now to FIG. 9, a digital compression circuit 166 includes an analyzer 168 coupled to a quantizer 170. A digital signal is fed to the analyzer input. The analyzer 168 decomposes the signal and the quantizer 170 performs a compression operation as described above in conjunction with FIG. 8. The quantizer 170 subsequently feeds a compressed digital signal to a first end of a digital link 172. A second end of the digital link 172 is coupled to an input port of a requantizer 174. The requantizer 174 receives the signal fed thereto performs an inverse quantization process and subsequently feeds a requantized signal to a synthesizer 176. For a digital scheme it is only necessary to perform a logical operation, such as an exclusive or operation, between the W signal and a random number RN.

Figure 10:
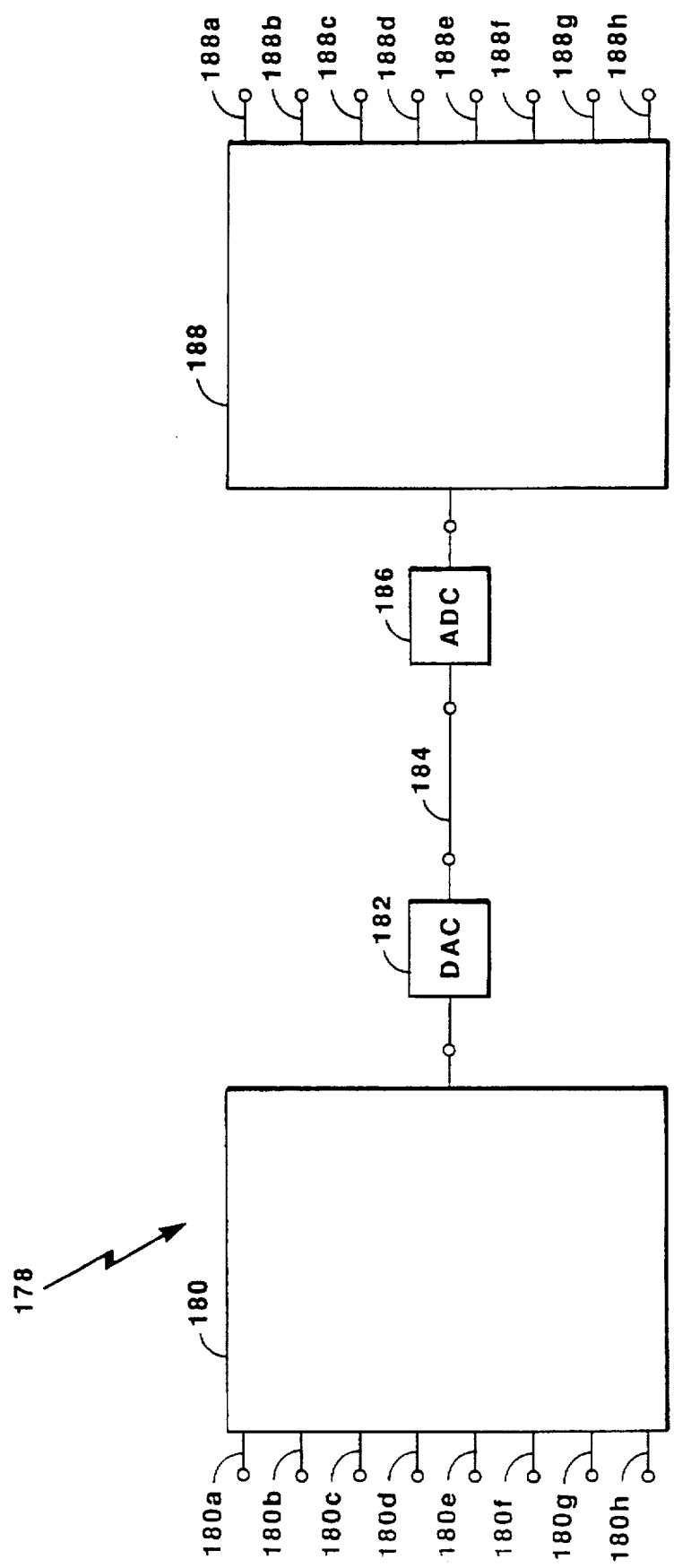
FIG. 10 is a block diagram of a modem.

Referring now to FIG. 10, a telephone modem 178 includes a synthesizer 180, capable of operation over the frequency band from 400 Hz to 3200 Hz. The synthesizer 180 feeds a signal to a DAC 182 having a sampling rate typically of about 6400 samples/second which converts the bit stream fed thereto to an analog signal. The analog signal is subsequently fed over an analog transmission link 184 to an ADC 186 also having a sampling rate typically of about 6400 samples/second. The ADC 186 converts the analog signal fed thereto to a digital bit stream. The digital bit stream is subsequently fed to an analyzer 188.

The synthesizer 180 may be provided in accordance with the matrix transformation methods described above in conjunction with FIG. 1. It should be noted, however, that the synthesizer 180 may alternatively be provided as a three level tree synthesizer in accordance with Equations 3 and 4 also described above in conjunction with FIG. 1.

In the matrix approach, the synthesizer 180 operates on the data frames fed thereto with a rotation matrix. Here, an 8 dimensional rotation matrix would be applied to the data frames. Similarly, the analyzer 188 would perform an inverse rotation operation by applying an 8 dimensional inverse matrix corresponding to the inverse matrix of the matrix used by the synthesizer 180.

As mentioned above, the basic sampling rate of the DAC 182 and ADC 186 is 6400 samples/sec. The digital input and output operate at a frame rate of ⅛ or 800 frames per second. Each frame may be composed, for example, of 35 bits divided into 7 words of 5 bits (or more) each and applied to channels 180a-180h. The thruput is 28,000 bps (35 bits times 800 frames/second). The usable rate is determined by the S/N ratio on the link 184 and forward error correction (FEC). Thus, the modem 178 may operate at a data transfer rate at or below 28 kbps.

Furthermore, the modem 178 may utilize FEC and as is common practice, the frequency range from 300 Hz to 400 Hz may be used for frequency shift keying (FSK) diagnostic signalling.

Channel 180h corresponds to signaling below 400 hz and cannot be used for data in this example. However, if a signal having a constant amplitude and alternating sign is applied to channel 180h then a 400 hz tone may be filtered from the line signal by a receiver (not shown) to aid in synchronization. In addition, the known preselected amplitude may be recovered from channel 188h as data and used as a gain calibration signal in the receiver and, may further be used to define block boundaries for FEC block coding schemes.

Accurate timing synchronization and gain calibration are important to the operation of the modem 178. As described above in conjunction with FIGS. 6 and 7, coded modems may obtain synchronization information without any tones appearing in the transmitted signal. Thus, clandestine communications by encrypting coded modems may be transmitted as low level, seemingly uncorrelated, noise in the same narrow bandwidth as simultaneous, non secret, communications.

The data in the channels 180a-180g may be scrambled, as is common practice in modems, so that the output appears more noise-like when transmitting the commonly encountered input string of 35 zeros or ones. Without scrambling, an input string of zeros will produce a modulated but strongly correlated output without a DC component.

The data received by the analyzer 188 will be a multiple of the actual data. The multiplication factor will correspond to the dimension of the rotation matrix which in turn corresponds to the number of channels in the synthesizer 180. The receiver should quantize, that is, round the received channel output to the nearest multiple then divide by the multiple to reduce the effects of noise on the link 184.

A modem using baseband modulation techniques, in which no carrier signal exists, may also be provided by using the matrix rotation approach or by the equations provided in conjunction with FIGS. 1-1D above. In either of these approaches, the modem must demodulate and process groups of two or more samples to recover the data. In a conventional baseband system, single samples are processed to recover the data.

Thus, in a baseband system a modem operating according to the matrix method described above should modulate and demodulate groups of samples. For example, if the matrix vectors are of length eight, then eight samples should be processed together as an independent group by the demodulator. That is, the demodulator multiplies the group of samples by the inverse matrix used in the modulator. It should be noted that the grouping of samples is part of the modulation and distinct, for example, from a block data coding method for error correction, and both techniques may be simultaneously used in a single modem.

Having described preferred embodiments of the invention, it will now become apparent to one of ordinary skill in the art that other embodiments incorporating the concepts may be used. It is felt, therefore, that these embodiments should not be limited to disclosed embodiments but rather should be limited only by the spirit and scope of the appended claims.

What is claimed is:

1. A multiple access transmission system comprising:

a first transmission link having a first signal propagating thereon;

a first modem, coupled to said first transmission link, said first modem for receiving a first signal for transmission and for providing a first modem transmission on said first transmission link, said first modem comprising:

a first baseband element comprising a first data assembly unit for receiving and mapping said first signal for transmission as a sequence of input data frames, each said input data frame comprising a plurality of data coordinates, and a first synthesizer filter-bank, in communication with said first data assembly unit, having at least one residual input, wherein said first data assembly unit provides each of said data coordinates to a respective one of said at least one residual input, and said first synthesizer filter-bank for combining said data coordinates using a first invertibis transformation to provide a first digital bit stream; and a first transmitter section in communication with said first baseband element and said first transmission link for deriving a first modem signal from said first digital bit stream of said first baseband element and for transmitting said first modem signal over said first transmission link as said first modem transmission; and a first receiver in communication with said first transmission link, said first receiver comprising:

a first receiver section for receiving said first signal and said first modem transmission as digital bit streams;

a first signal processing section in communication with said first receiver section for providing a first output in response to reception of said first signal; and a first data recovery unit, in communication with said first receiver section, comprising a first analyzer filter-bank having an input and at least one residual output on which is provided a second output in response to reception of said first modem transmission, and a first data partitioning unit in communication with said first analyzer filter-bank;

wherein said first analyzer filter-bank for receiving, on said input, said first digital bit stream of said first modem transmission from said first receiver section and for distinguishing output data frames as said second output using an inverse of said first invertible transformation applied to said first modem transmission digital bit stream, wherein each element of said second output corresponds to at least one data coordinate of said input frame, and wherein said first data partitioning unit for partitioning said output data frames into said first signal for transmission, wherein said first signal and said first modem transmission are transmitted on said first transmission link and wherein said first signal and said first modem transmission are present on said first transmission link concurrently for at least some period of time.

2. The system of claim 1 wherein said first modem transmission is provided having a signal power level less than the signal power level of said first signal.

3. The system of claim 1 wherein said at least one first residual input of said first modem synthesizer filter-bank is a first one of a plurality of different residual inputs having provided thereon one of a like plurality of frame data coordinates of signals for transmission, each for transmission by said first modem as a first modem transmission on said first transmission link, wherein each of said first modem transmissions are transmitted on said first transmission link and are present on said first transmission link concurrently with said first signal for at least some period of time.

4. The system of claim 1 further comprising;

a second modem, coupled to said first transmission link, said second modem for receiving a second signal for transmission and for providing a second modem transmission on said first transmission link, said second modem comprising:

a second baseband element comprising a second data assembly unit for receiving and mapping said second signal for transmission as a sequence of input data frames, each said input data frame comprising a plurality of data coordinates, and a second synthesizer filter-bank in communication with said second data assembly unit, having at least one residual input, wherein said second data assembly unit provides each of said data coordinates to a respective one of said at least one residual input, and said second synthesizer filter-bank for combining said data coordinates using a second invertible transformation to provide a second digital bit stream; and a second transmitter section in communication with said second baseband element and said first transmission link for deriving a second modem signal from said second digital bit stream of said second baseband element and for transmitting said second modem signal over said first transmission link as said second modem transmission, wherein said second signal for transmission provided to said second modem is provided having a signal characteristic which is different than a signal characteristic of said first signal for transmission provided to said first modem; and wherein said first signal, said first modem transmission and said second modem transmission are transmitted on said first transmission link and are present on said first transmission link concurrently for at least some period of time.

5. The system of claim 1 wherein said first modem is a first one of a plurality of modems, each of said plurality of modems coupled to said first transmission link, each of said plurality of modems having the same components and the same functional capabilities as said first modem, and each of said plurality of modems having at least one residual input to a respective synthesizer filter-bank on which is provided data coordinates, derived by a respective data assembly unit from a respective one of a like plurality of signals for transmission, for conversion of said respective signal for transmission into a respective modem transmission on said first transmission link, wherein:

each one of the like plurality of signals for transmission provided to said at least one residual input of a respective modem is provided having a different signal characteristic; and said first signal and each of said plurality of modem transmissions are transmitted on said first transmission link and are present on said first transmission link concurrently for at least some period of time.

6. The system of claim 5 wherein said receiver further comprises a correlator and receives said first signal and each of said plurality of modem transmissions, said correlator providing an output signal in response to reception of each of the plurality of modem transmissions.

7. The system of claim 1 wherein said first modem signal is applied to a carrier signal to provide said first modem transmission on said first transmission link.

8. The system of claim 1 wherein a sample rate of said digital bit stream in said first transmitter section is greater than a sample rate of said residual input in said first synthesizer filter bank.

9. The system of claim 1 wherein said signal for transmission is derived from said first digital bit stream by modulation of a carrier in said first transmitter section using a carrier modulator.

10. The system of claim 9 wherein said first transmitter section comprises a digital-to-analog converter and band-limiting post-filter for modulating said carrier with said first digital bit stream.

11. The system of claim 1 wherein said first data partitioning unit further comprises at least one of the group consisting of synchronization, normalization and quantization sections for enabling the partitioning of said output data frames into said first signal for transmission.

12. The system of claim 1 wherein said first synthesizer filter-bank is implemented as a rotation element for rotation of said data coordinates received at said at least one residual input, followed by a parallel-to-serial conversion element for parallel-to-serial conversion of said rotated data coordinates to generate said first digital bit stream.

13. The system of claim 12 wherein said first analyzer filter-bank is implemented as a serial-to-parallel conversion element for serial-to-parallel conversion of said first modem transmission, followed by counter-rotation element for providing a counter-rotation of said converted first modem transmission, said counter-rotation element being complimentary to the rotation of said rotation element, said counter-rotation element providing said output data frames.

14. The system of claim 13 wherein said rotation element comprises a transmit matrix multiplier and a first matrix thereof, said transmit matrix multiplier for multiplying a first input data frame by said first matrix for providing said rotated data coordinates, said first matrix multiplier having row and column dimensions corresponding to a total number of coordinates in said first input data frame, and said counter-rotation element comprises a receive matrix multiplier and a second matrix thereof, said receive matrix multiplier for multiplying said first modem transmission digital bit stream by said second matrix, said receive matrix multiplier being complimentary to said transmit matrix multiplier.

15. The system of claim 14 wherein each of said rotation and counter-rotation elements further comprises:

a memory in association with a respective one of said matrix multipliers for storing plural input data frames;

plural supplementary matrices, each for multiplication, by said respective matrix multiplier, with a respective one of said plural input data frames; and a summation element, in conjunction with said respective matrix multiplier, for adding products of said plural supplementary matrices with said plural input data frames to provide plural rotated data coordinates, wherein said synthesizer filter-bank provides storage for said plural input data frames, and wherein the number of said plural supplementary matrices and the number of said plural input data frames are each equal to the number of said plural input data frames stored in said first synthesizer filter-bank.

16. The system of claim 1 wherein said first data assembly unit is comprised of an analog signal analysis element providing a band-limiting pre-filter to said first signal for transmission, an analog-to-digital conversion of said pre-filtered signal for transmission, followed by a preliminary analyzer filter-bank for preliminarily distinguishing said converted signal for transmission into filter banks, and wherein said first data partitioning unit is comprised of an analog signal synthesis element providing a subsequent synthesizer filter-bank, for combining said output data frames, followed by a digital-to-analog converter having a band-limiting post-filter for converting said combined output data frames.

17. The system of claim 16 wherein said analog signal analysis element further comprises a digital encryptor element at an output of said preliminary analyzer filter-bank for digitally encrypting said preliminarily distinguished signal for transmission, and wherein said analog synthesis element further comprises a digital decryptor element at an input to said subsequent synthesizer filter-bank for digitally decrypting said received first modem transmission.

18. A multiple access transmission system for transmitting signals on a transmission link, the transmission system comprising:

a first modem, coupled to the first transmission link, said first modem having at least one residual input to a first synthesizer filter-bank on which is provided a signal for transmission by said first modem as a first modem transmission on the transmission link; and a second modem, coupled to the transmission link, said second modem having at least one residual input to a second synthesizer filter-bank on which is provided a signal for transmission by said second modem as a second modem transmission on the transmission link, wherein the signal for transmission provided to the residual input of said second modem is provided having a signal characteristic which is different than the signal characteristic of the signal for transmission provided to the residual input of said first modem, wherein each of said first and second modems further comprises:

a data assembly unit associated with a respective one of said first and second synthesizer filter-banks for receiving said signal for transmission and for mapping said signal for transmission as a sequence of input data frames, each said input frame comprising a plurality of data coordinates as inputs to a respective one of said at least one residual input, and wherein said first and second synthesizer filter-banks each combines said data coordinates using an invertible transformation to provide said first and second modem transmission, respectively, and wherein said first modem transmission and said second modem transmission are transmitted on the transmission link and are present on the transmission link concurrently for at least some period of time.

19. The multiple access transmission system of claim 18 wherein said first and second modem transmissions are provided as data bits.

20. The multiple access transmission system of claim 18 wherein the multiple access transmission system further comprises:

a receiver for receiving said first and second modem transmissions, wherein said receiver comprises:

an analyzer having an input for receiving said first and second modem transmissions and having at least one residual output, said analyzer for distinguishing output data frames using an inverse of said invertible transformation applied to one of said first and second modem transmissions, and for providing on said at least one residual output at least one data coordinate of output data frames corresponding to said input data frames; and a data partitioning unit for partitioning said output data frames into an output signal.

21. The multiple access transmission system of claim 20 wherein said first and second modem transmissions are orthogonally coded using respective ones of a set of orthogonal codes, and said receiver further comprises a correlator providing a sliding correlator for obtaining synchronization with either of said coded first and second modem transmissions.

22. The multiple access transmission system of claim 18 wherein said first modem transmission is applied to a first carrier signal to provide a modulated first modem transmission on said transmission link, and said second modem transmission is applied to a second carrier signal to provide a modulated second modem transmission on said transmission link.

23. A method of operating a plurality of modems over a single transmission link, the method comprising the steps of:

transmitting a first modem transmission from a first modem wherein said first modem transmission is provided by:

mapping a first modem signal for transmission as a sequence of data frames, said data frames comprised of data coordinates; and combining said data coordinates using a first invertibis transformation to form a first digital bit stream, said first modem transmission derived from said first digital bit stream; and transmitting a second modem transmission from a second different modem wherein said second modem transmission is provided by:

mapping a-second modem signal for transmission as a sequence of data frames, said data frames comprised of data coordinates;

combining said data coordinates using a second invertible transformation to form a second digital bit stream, said second modem transmission derived from said second digital bit stream, wherein the combined signal power of said first and second modem transmissions is below a predetermined value corresponding to a maximum power level of the link.

24. The method of claim 23 wherein said first and second modem transmissions are each twice coded modem signals and are provided as a sequence of different orthogonally coded bits of data.

25. The method of claim 24 further comprising the steps of:

transmitting a synchronization signal over the single transmission link;

receiving the synchronization signal in a receiver having a predetermined correlation code; and correlating the synchronization signal with the correlation code of the receiver.

26. The method of claim 25 wherein the step of correlating the synchronization signal with the correlation code of the receiver includes the steps of:

sliding the correlation code of the receiver relative to the synchronization signal;

correlating the synchronization signal with the correlation code of the receiver; and repeating the sliding and correlating steps until the receiver is synchronized with the synchronization signal.

27. The method of claim 23 wherein said step of deriving each of said first and second modem transmissions further comprises modulating a respective carrier with a respective one of said first and second digital bit streams.

28. The method of claim 27 wherein said step of modulating further comprises digital-to-analog converting and bandlimiting post-filtering a respective one of said first and second digital bit streams.

29. The method of claim 23 wherein said step of combining said data coordinates, for each of said first and second modems, comprises rotating said data coordinates employing a rotation matrix, then parallel-to-serial converting said rotated coordinates.

30. The method of claim 23 wherein said steps of mapping said first and second modem signals for transmission each comprises band-limit pre-filtering said signals for transmission, analog-to-digital converting said pre-filtered signals for transmission, then distinguishing data frames from said converted signals for transmission using a preliminary analyzer filter-bank.

31. The method of claim 30 wherein said step of distinguishing is followed by a step of digitally encrypting said data frames.

* * * * *

UNITED STATES PATENT AND TRADEMARK OFFICE
CERTIFICATE OF CORRECTION

Figure 4:
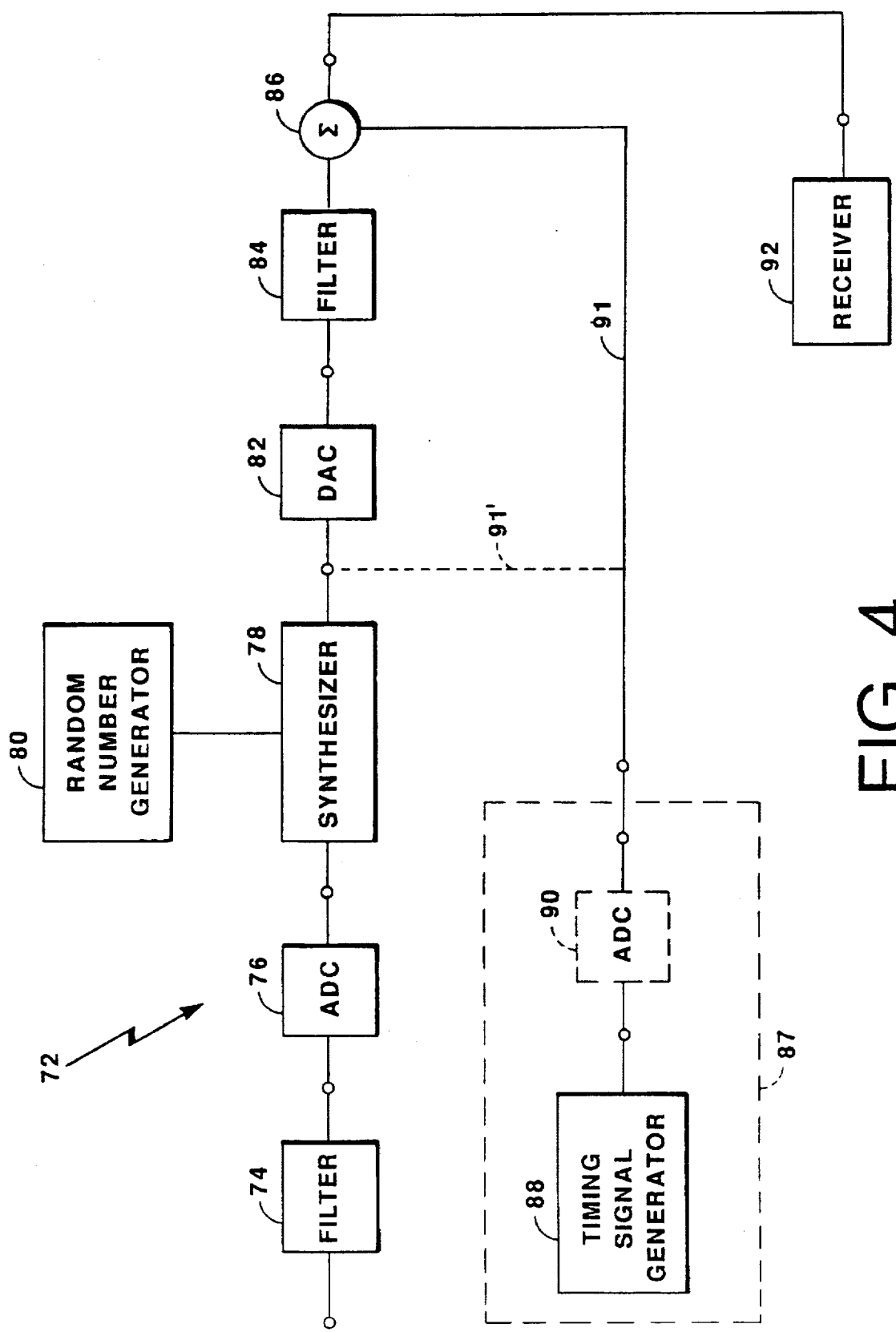
FIG. 4 is a block diagram of a signal encrypting transmitting and receiving system.

PATENT NO : 5,682,404
DATED : October 28, 1997
INVENTOR(S) : William J. Miller It is certified that error appears in the above-identified patent and that said Letters Patent are hereby corrected as shown below:

```
Column 4, line 43, "W,", should read --W`--;

Column 6, line 19, "[Y]=[[C.],[X], [C.],[X], [C.],[X], [C.],[X]]",
should read --[Y]=[[C.]*[X], [C.]*[X], [C.]*[X], [C.]*[X]]--;

Column 13, line 40, "FIG 4.", should read --FIG. 3.--; and

Column 13, line 62, "8d.", should read --82.--.
```

Signed and Sealed this

Eighth Day of May, 2001

*Attest:*

NICHOLAS P. GODICI

*Attesting Officer*     *Acting Director of the United States Patent and Trademark Office*